United States Patent
Mistry et al.

(10) Patent No.: US 10,285,056 B2
(45) Date of Patent: *May 7, 2019

(54) USING DERIVED CREDENTIALS FOR ENROLLMENT WITH ENTERPRISE MOBILE DEVICE MANAGEMENT SERVICES

(71) Applicant: Citrix Systems, Inc., Fort Lauderdale, FL (US)

(72) Inventors: Shaunak Mistry, Scotts Valley, CA (US); Younus Aftab, Pleasanton, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/483,076

(22) Filed: Apr. 10, 2017

(65) Prior Publication Data

US 2018/0049026 A1    Feb. 15, 2018

Related U.S. Application Data

(63) Continuation of application No. 14/865,376, filed on Sep. 25, 2015, now Pat. No. 9,668,136.

(51) Int. Cl.
*H04L 29/06* (2006.01)
*H04W 12/06* (2009.01)
(Continued)

(52) U.S. Cl.
CPC ........... *H04W 12/06* (2013.01); *H04L 63/083* (2013.01); *H04L 63/0823* (2013.01);
(Continued)

(58) Field of Classification Search
CPC .................................................. H04L 63/0823
See application file for complete search history.

(56) References Cited

U.S. PATENT DOCUMENTS 7,650,303 B2    1/2010  Loeper
8,613,070 B1 *  12/2013 Borzycki ............ G06F 21/6218
                                        726/8
(Continued)

OTHER PUBLICATIONS

Dec. 5, 2016—(WO) International Search Report and Written Opinion—PCT/US2016/052057.

(Continued)

*Primary Examiner* — Ali Shayanfar
(74) *Attorney, Agent, or Firm* — Banner & Witcoff, Ltd.

(57) ABSTRACT

Methods, systems, and computer-readable media for using derived credentials to enroll a mobile computing device with an enterprise mobile device management system are described herein. In various embodiments, a mobile computing device, responsive to a command to enroll with an enterprise mobile device management server, may launch an enrollment application; send an enrollment request message to the enterprise mobile device management server; switch to a certificate management system application on the mobile computing device; request one or more derived credentials from a certificate management system server; store the one or more derived credentials in a shared vault on the mobile computing device; switch to the enrollment application; retrieve a derived credential of the one or more derived credentials stored in the shared vault; and, provide the derived credential to the enterprise mobile device management server to enroll the mobile computing device with at least one mobile device management service.

18 Claims, 13 Drawing Sheets

(51) Int. Cl.
*H04L 29/08* (2006.01)
*H04W 4/50* (2018.01)
*H04W 4/60* (2018.01)

(52) U.S. Cl.
CPC ............ *H04L 67/141* (2013.01); *H04W 4/50* (2018.02); *H04W 4/60* (2018.02)

(56) References Cited

U.S. PATENT DOCUMENTS

| | | | |
|---|---|---|---|
| 8,650,303 B1* | 2/2014 | Lang | G06F 21/51 |
| | | | 709/226 |
| 9,170,800 B2* | 10/2015 | Lang | G06F 8/52 |
| 9,380,077 B2* | 6/2016 | Martini | H04L 63/18 |
| 2013/0219176 A1* | 8/2013 | Akella | H04L 63/0815 |
| | | | 713/165 |
| 2014/0040977 A1 | 2/2014 | Barton et al. | |
| 2014/0109174 A1 | 4/2014 | Barton et al. | |
| 2014/0298401 A1* | 10/2014 | Batson | H04L 67/10 |
| | | | 726/1 |
| 2015/0095970 A1* | 4/2015 | Shetty | H04L 63/0209 |
| | | | 726/1 |
| 2015/0127607 A1 | 5/2015 | Savage et al. | |
| 2015/0188777 A1* | 7/2015 | Frost | H04L 67/34 |
| | | | 709/223 |
| 2015/0199213 A1* | 7/2015 | Desai | G06F 9/468 |
| | | | 718/102 |
| 2015/0215772 A1* | 7/2015 | Gattu | H04W 8/245 |
| | | | 455/418 |
| 2015/0244711 A1* | 8/2015 | Venkataraman | H04L 63/0823 |
| | | | 713/156 |
| 2015/0319144 A1* | 11/2015 | Barton | H04L 63/0428 |
| | | | 713/168 |
| 2015/0319226 A1* | 11/2015 | Mahmood | H04L 43/0817 |
| | | | 709/201 |
| 2015/0319252 A1 | 11/2015 | Momchilov et al. | |

OTHER PUBLICATIONS

Microsoft "Windows Phone 8.1 Mobile evice Management Overview" Apr. 1, 2014.
Citrix "Citrix XenMobile Technology Overview | White Paper", Citrix White papers online, Jul. 31, 2012.
Jan. 13, 2017—Notice of Allowance—U.S. Appl. No. 14/865,376.

* cited by examiner

USING DERIVED CREDENTIALS FOR ENROLLMENT WITH ENTERPRISE MOBILE DEVICE MANAGEMENT SERVICES

CROSS-REFERENCE TO RELATED APPLICATIONS

This application is a continuation of and claims priority to U.S. patent application Ser. No. 14/865,376, filed Sep. 25, 2015, and entitled "Using Derived Credentials for Enrollment with Enterprise Mobile Device Management Services," the disclosure of which is incorporated by reference herein in its entirety.

FIELD

Aspects described herein generally relate to computers, networking, hardware, and software, cryptography, and security measures in place therein. More specifically, one or more aspects of the disclosure relate to enterprise mobile device management services, and in particular, relate to using derived credentials for enrollment with enterprise mobile device management services.

BACKGROUND

Enterprises (e.g., corporations, partnerships, governments, academic institutions, other organizations, etc.) face continuously increasing risks of malicious attacks waged against their computer networks and assets. Some enterprises have mitigated the risks of unauthorized access to their enterprise resources by implementing strong password policies across their organizations. The password policies typically forced enterprise users to create and maintain a myriad of passwords to access enterprise resources and to regularly change those passwords. However, these password policies have not been without their share of problems. Most enterprise users ended up creating passwords that were easy for them to remember but were vulnerable to brute force, dictionary, or social engineering attacks. Additionally, users tended to forget or misplace these passwords, leading to issues when attempting to access enterprise resources.

In order to address some of the issues with password policies, some enterprises have augmented their network and computer security procedures to include deployment and maintenance of Personal Identity Verification (PIV) cards or Common Access Card (CAC) cards. The advantages to the enterprise of these cards are at least two-fold. First, the cards are designed to provide two-factor authentication: physical possession of the card and a personal identification number (PIN) known only to the owner of the card. Second, the cards allow an enterprise to generate and assign derived credentials to an enterprise user. The term "derived credentials" may refer to cryptographic credentials that may be derived from those in a PIV or CAC card and may be stored in a computing device rather than on the card. Through the use of these cards, the enterprise, and not the enterprise user, can control the derived credentials that provide access to resources and the lifecycle and/or lifetime of the derived credentials. An enterprise can create, assign, change, deprecate, or revoke derived credentials as the enterprise determines necessary to protect their enterprise resources. Stated differently, an enterprise user might not need to know the passwords needed to access enterprise resources; rather, the enterprise user might only need to insert their PIV or CAC card into a card reader and enter their PIN.

With the emergence of a newer generation of computing devices and in particular with mobile computing devices, the use of PIV and CAC cards has proved challenging. PIV and CAC cards are geared towards traditional computing devices (e.g., desktop and laptop computers) with which the card readers can be easily integrated. Mobile devices lack the integrated smart card readers found in laptop and desktop computers and require separate card readers attached to devices to provide authentication services from the device. Typically, enterprise PIV or CAC card users must authenticate and present their card every instance in which they require a new derived credential. Accordingly, the user experience of generating derived credentials with a PIV or CAC card on a mobile computing device results in negating most of the portability and mobility advantages that the mobile computing devices provide.

The magnitude and complexity of the situation is further increased by the current trend towards BYOD—bring your own device. BYOD environments allow enterprise users to provide their own devices, such as mobile phones, smartphones, tablets, laptops, personal computers, or other electronic devices, for work purposes in addition to the computer resources provided by the enterprise. However, BYOD scenarios pose inherent security risks to the enterprise because the enterprise typically lacks uniform and full control over each employee-provided device and because many enterprise users may resist integrating card readers to their personal mobile computing devices. In a BYOD world, enterprise mobility management (EMM) solutions are emerging as a popular way to assist in the management and control of remote access to enterprise resources from personal devices. EMM solutions have traditionally taken the approach of managing mobile computing devices through what are known as mobile device management (MDM) services and mobile application management (MAM) services. Mobile device management policies control mobile computing devices using access control and monitoring technologies. Mobile application management policies deliver enterprise software to mobile computing devices and administer that software. These policies support the incorporation of various security features, including geo-fencing features, remote wipe features, application isolation features, and data vault encryption features. While these EMM solutions increase the security of using personal devices to access enterprise resources, these solutions are also bound to only increase the number of credentials required to access the enterprise resources. Typically, enterprise users must know and enter their usernames and network or directory services password or they must provide a one-time password (OTP) generated by the EMM server. Furthermore, some EMM solutions may rely on the credentials stored on a PIV or CAC card for identification and authentication, which results in the enterprise user having to provide their PIV or CAC card every time they wish to access enterprise resources.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein relate to systems, methods, and techniques for using derived credentials for enrollment of mobile computing devices with enterprise mobile device management services. Advantageously, the systems, methods, and techniques described herein allow for enrollment of a mobile computing device and access of enterprise resources from the enrolled mobile computing device without the need for the enterprise user to know or enter their network or directory service password and without the need for the PIV or CAC card to be physically connected to the mobile computing device during enrollment or subsequent access of enterprise resources.

In accordance with one or more embodiments, a method may comprise receiving, by a mobile computing device, a command to enroll with an enterprise mobile device management server; in response to receiving the command to enroll with the enterprise mobile device management server, launching, by the mobile computing device, an enrollment application; sending, by the mobile computing device, using the enrollment application, an enrollment request message to the enterprise mobile device management server; switching, by the mobile computing device, from the enrollment application to a certificate management system application on the mobile computing device; requesting, by the mobile computing device, using the certificate management system application, one or more derived credentials from a certificate management system server; storing, by the mobile computing device, using the certificate management system application, the one or more derived credentials in a shared vault on the mobile computing device; switching, by the mobile computing device, from the certificate management system application to the enrollment application; retrieving, by the mobile computing device, using the enrollment application, a derived credential of the one or more derived credentials stored in the shared vault on the mobile computing device; and, providing, by the mobile computing device, using the enrollment application, the derived credential of the one or more derived credentials retrieved using the enrollment application to the enterprise mobile device management server to enroll the mobile computing device with at least one mobile device management service provided by the enterprise mobile device management server.

In some embodiments, the method may further comprise prompting, by the mobile computing device, using the enrollment application, a user of the mobile computing device, for an address of the enterprise mobile device management server.

In other embodiments, the method may further comprise requesting, by the mobile computing device, using the enrollment application, configuration information for the enterprise mobile device management server from an automatic discovery service; and after requesting the configuration information for the enterprise mobile device management server from the automatic discovery service, receiving, by the mobile computing device, a message comprising the configuration information for the enterprise mobile device management server from the automatic discovery service. The enrollment request message sent to the enterprise mobile device management server may comprise the configuration information for the enterprise mobile device management server received from the automatic discovery service.

Alternatively, in yet other embodiments, the method may further comprise receiving, by the mobile computing device, using the enrollment application, a password from the user of the mobile computing device; generating, by the mobile computing device, using the enrollment application, a password validation value based on the password received from the user of the mobile computing device; storing, by the mobile computing device, using the enrollment application, the password validation value in the shared vault on the mobile computing device; providing, by the mobile computing device, using the enrollment application, the password received from the user of the mobile computing device to the certificate management system application; and, validating, by the mobile computing device, using the certificate management system application, the provided password to the certificate management system application based on the password validation value stored in the shared vault on the mobile computing device. The method may further comprise receiving, by the mobile computing device, responsive to the enrollment request message, a message from the enterprise mobile device management server comprising password complexity validation rules; and, validating, by the mobile computing device, the password using the password complexity validation rules. The password validation value may be generated by generating a hash of the password, and encrypting the hash of the password. The method may further comprise encrypting, by the mobile computing device, using the certificate management system application, the one or more derived credentials based on the password received from the user of the mobile computing device and provided to the certificate management system application, prior to storing the one or more derived credentials in the shared vault on the mobile computing device. The method may further comprise encrypting, by the mobile computing device, using the certificate management system application, the one or more derived credentials using a private/public key pair, prior to storing the one or more derived credentials in the shared vault on the mobile computing device.

In some instances, prior to switching to the certificate management system application on the mobile computing device, the method may further comprise receiving, by the mobile computing device, responsive to the enrollment request message, a message from the enterprise mobile device management server identifying the certificate management system application on the mobile computing device; and, determining, by the mobile computing device, to switch to the certificate management system application on the mobile computing device based on the message received from the enterprise mobile device management server identifying the certificate management system application on the mobile computing device.

In other instances, the method may further comprise storing, by the mobile computing device, using the certificate management system application, at least one derived credential of the one or more derived credentials after the enrollment process is completed.

In yet other instances, the enrollment application and the certificate management system application may be digitally signed with an identical development signing certificate.

In some embodiments, the method may further comprise retrieving, by the mobile computing device, using one or more applications on the mobile computing device that are digitally signed with the same development signing certificate as the enrollment application and the certificate management system application, at least one derived credential of the one or more derived credentials from the shared vault; and using, by the mobile computing device the at least one derived credential of the one or more derived credentials retrieved from the shared vault to provide functionality in the one or more applications on the mobile computing device or to access enterprise resources with the one or more applications on the mobile computing device.

In some embodiments, the method may further comprise retrieving, by the mobile computing device, using the enrollment application, a first derived credential and a second derived credential from the shared vault; providing, by the mobile computing device, using the enrollment application, the first derived credential to the enterprise mobile device management server to complete mobile device management enrollment; and, providing, by the mobile computing device, using the enrollment application, the second derived credential to the enterprise mobile device management server to complete mobile application management enrollment.

In some embodiments, the mobile computing device may be provisioned by the enterprise mobile device management server with policies and applications after the enrollment process is completed.

In other embodiments, prior to requesting the one or more derived credentials from the certificate management system server, the method may further comprise: authenticating, by the mobile computing device, using the certificate management system application, with the certificate management system server using the certificate management system application.

In some embodiments, the user of the mobile computing device may be prompted to provide data for identification and authentication purposes for authenticating with the certificate management system server.

In some embodiments, switching to the certificate management system application on the mobile computing device may comprise: launching the application store on the mobile computing device; and, prompting the user of the mobile computing device to install the certificate management system application, if or when the certificate management system application is not installed on the mobile computing device.

Systems and non-transitory computer readable media may be configured to provide and/or support various aspects described herein. These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards systems, methods, and techniques for using derived credentials for enrollment of mobile computing devices with enterprise mobile device management services. Aspects described herein may be used when an employee of an enterprise may need to enroll their mobile computing device with the enterprise mobile device management services using derived credentials. Other aspects described herein may be used when an enterprise user may use derived credentials to access enterprise resources from the user's enrolled mobile computing device.

Before discussing these concepts in greater detail, several examples of computing architecture and systems that may be used in implementing and/or otherwise providing various aspects of the disclosure will first be discussed with respect to FIGS. 1-6.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
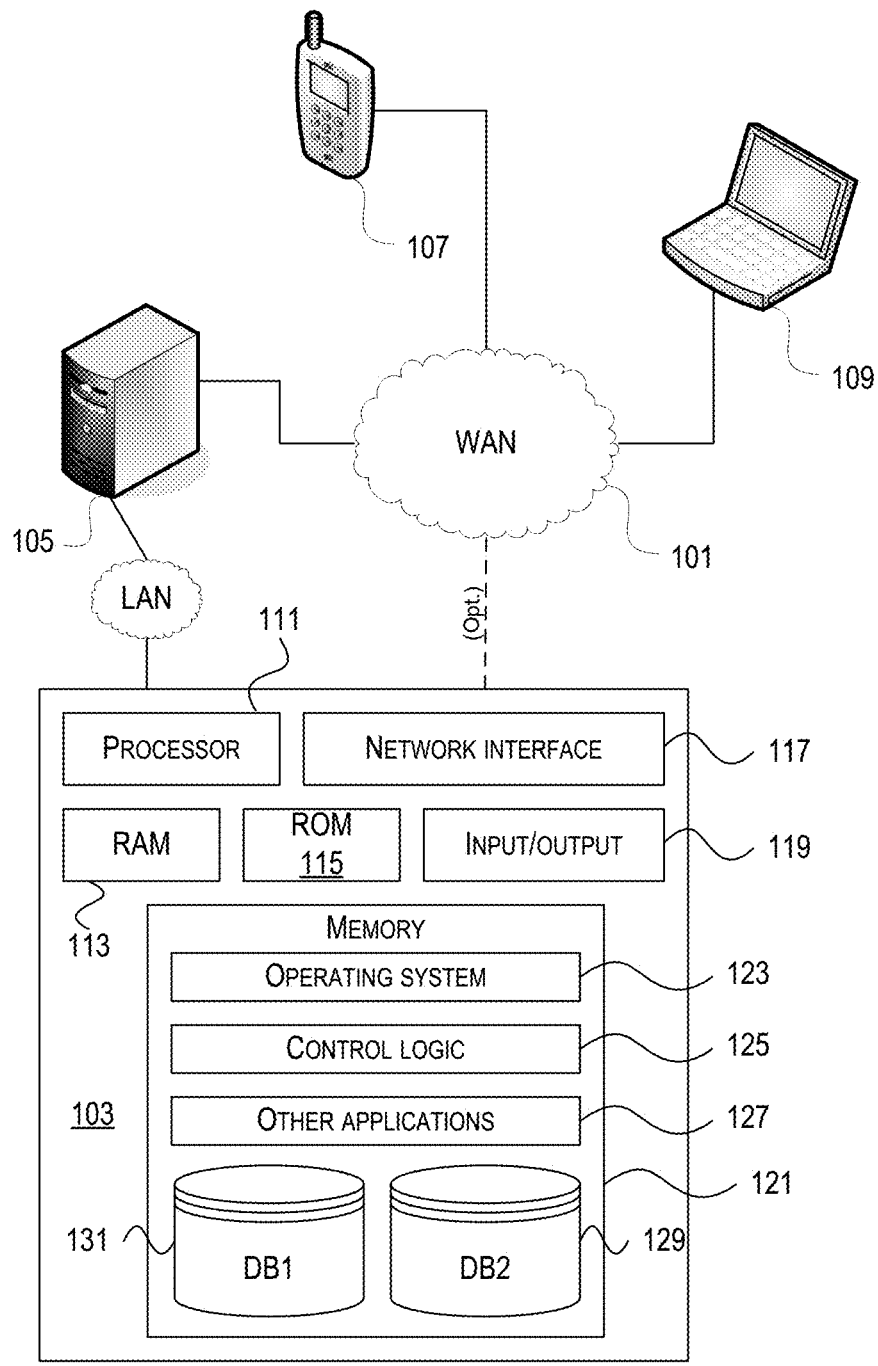
FIG. 1 depicts an illustrative computer system architecture that may be used in accordance with one or more illustrative aspects described herein.

Computer software, hardware, and networks may be utilized in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
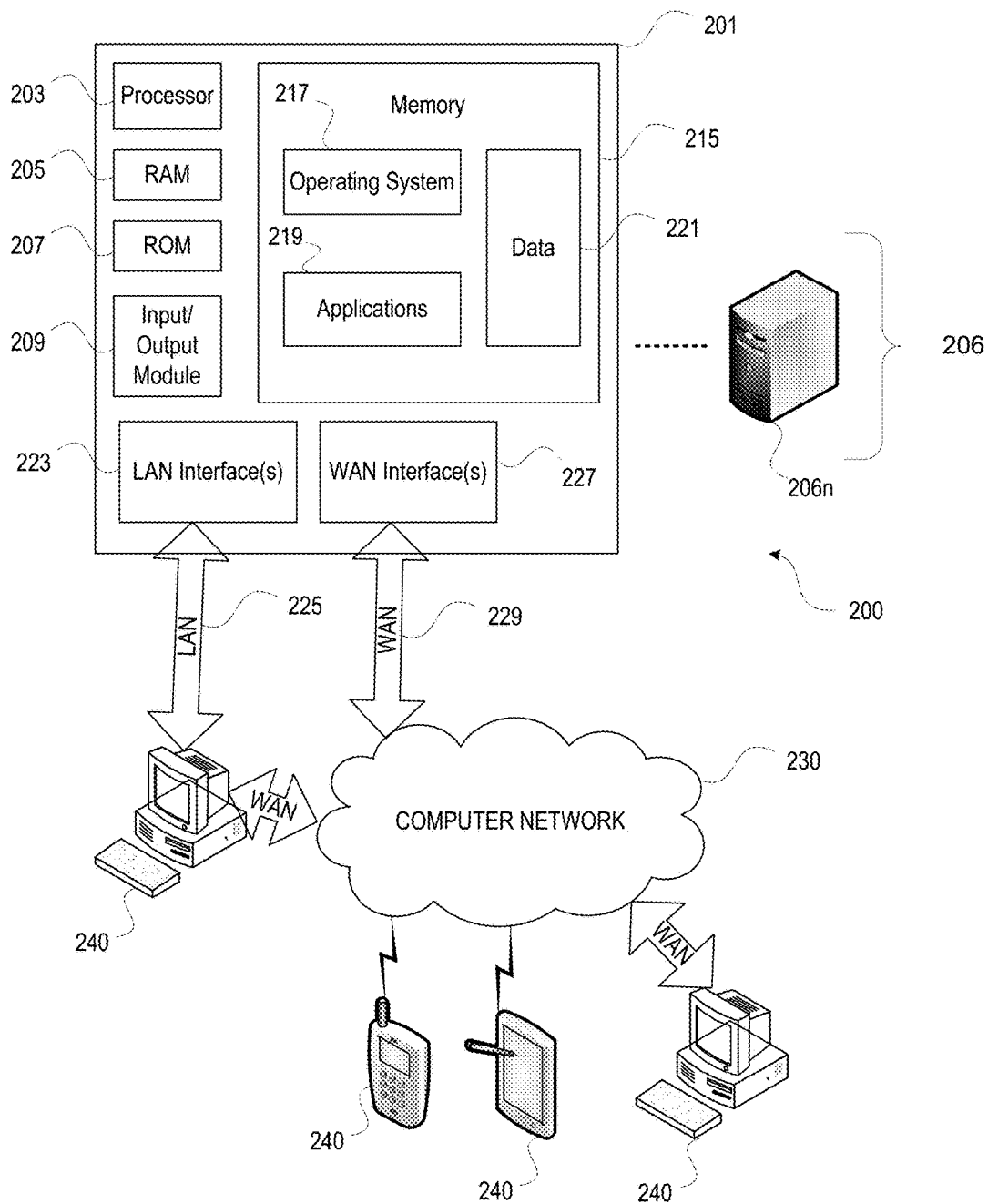
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a generic computing device 201 in an illustrative computing environment 200 that may be used according to one or more illustrative aspects described herein. Generic computing device 201 may be used as a server 206a in a single-server or multi-server desktop virtualization system (e.g., a remote access or cloud system) configured to provide virtual machines for client access devices. The generic computing device 201 may have a processor 203 for controlling overall operation of the server and its associated components, including RAM 205, ROM 207, I/O module 209, and memory 215.

I/O module 209 may include a mouse, keypad, touch screen, scanner, optical reader, and/or stylus (or other input device(s)) through which a user of generic computing device 201 may provide input, and may also include one or more of a speaker for providing audio output and a video display device for providing textual, audiovisual, and/or graphical output. Software may be stored within memory 215 and/or other storage to provide instructions to processor 203 for configuring generic computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the generic computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b, and responds to the request generated by the client machine 240 with a response from the second server 206b. First server 206a may acquire an enumeration of applications available to the client machine 240 and well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Figure 3:
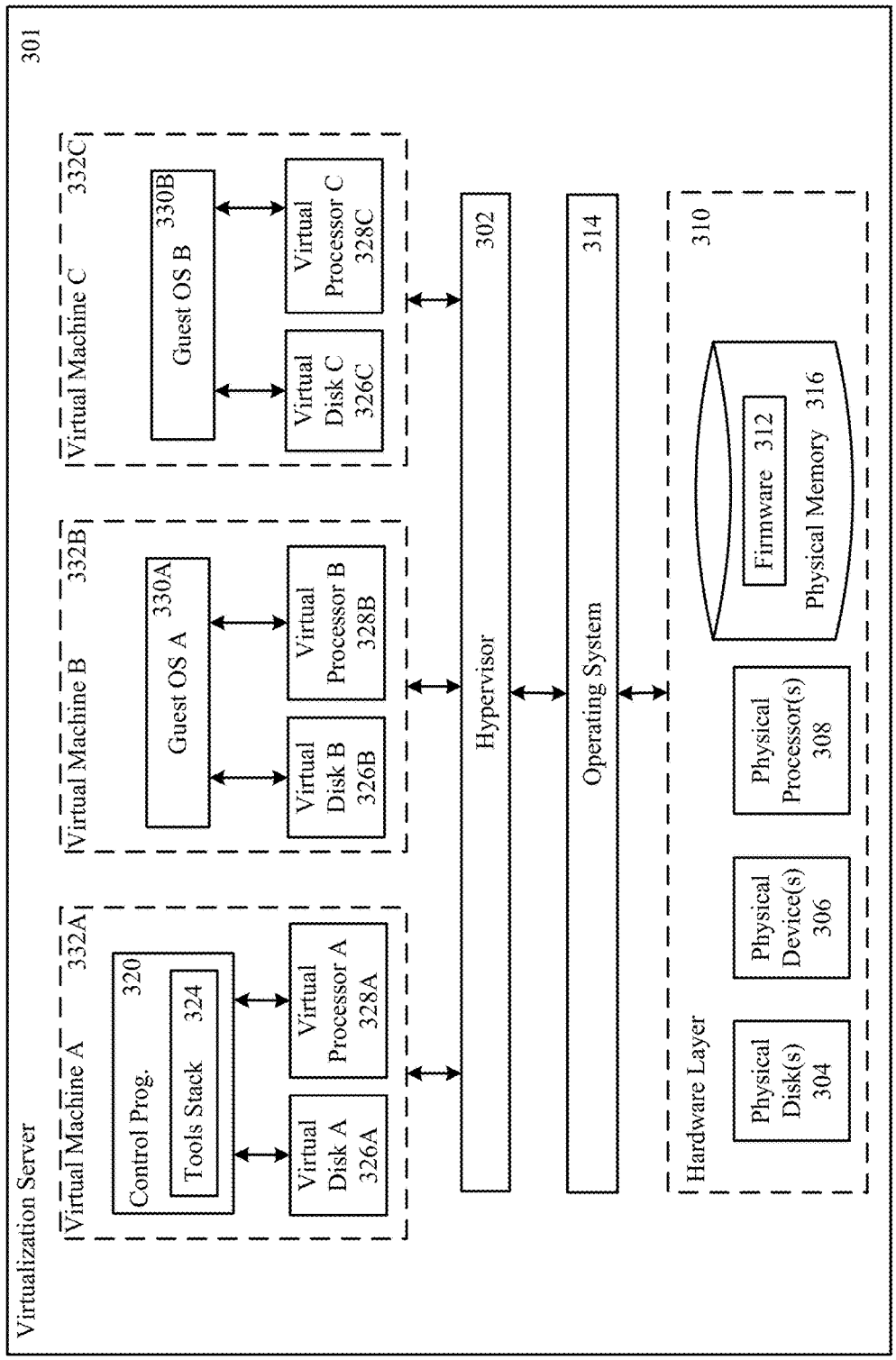
FIG. 3 depicts an illustrative virtualized (hypervisor) system architecture that may be used in accordance with one or more illustrative aspects described herein.

FIG. 3 shows a high-level architecture of an illustrative desktop virtualization system. As shown, the desktop virtualization system may be single-server or multi-server system, or cloud system, including at least one virtualization server 301 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

A computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308 and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more memory 216. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor that executes within an operating system 314 executing on the virtualization server 301. Virtual machines then execute at a level above the hypervisor. In some embodiments, the Type 2 hypervisor executes within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316 and any other component included in virtualization server 301 hardware layer 310. Hypervisor 302 may be used to emulate virtual hardware, partition physical hardware, virtualize physical hardware, and/or execute virtual machines that provide access to computing environments. In still other embodiments, hypervisor 302 controls processor scheduling and memory partitioning for a virtual machine 332 executing on virtualization server 301. Hypervisor 302 may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, virtualization server 301 executes a hypervisor 302 that creates a virtual machine platform on which guest operating systems may execute. In these embodiments, the virtualization server 301 may be referred to as a host server. An example of such a virtualization server is the XEN SERVER provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may executes a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may presents at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, provides each virtual machine 332 with a unique virtual view of the physical hardware, memory, processor and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
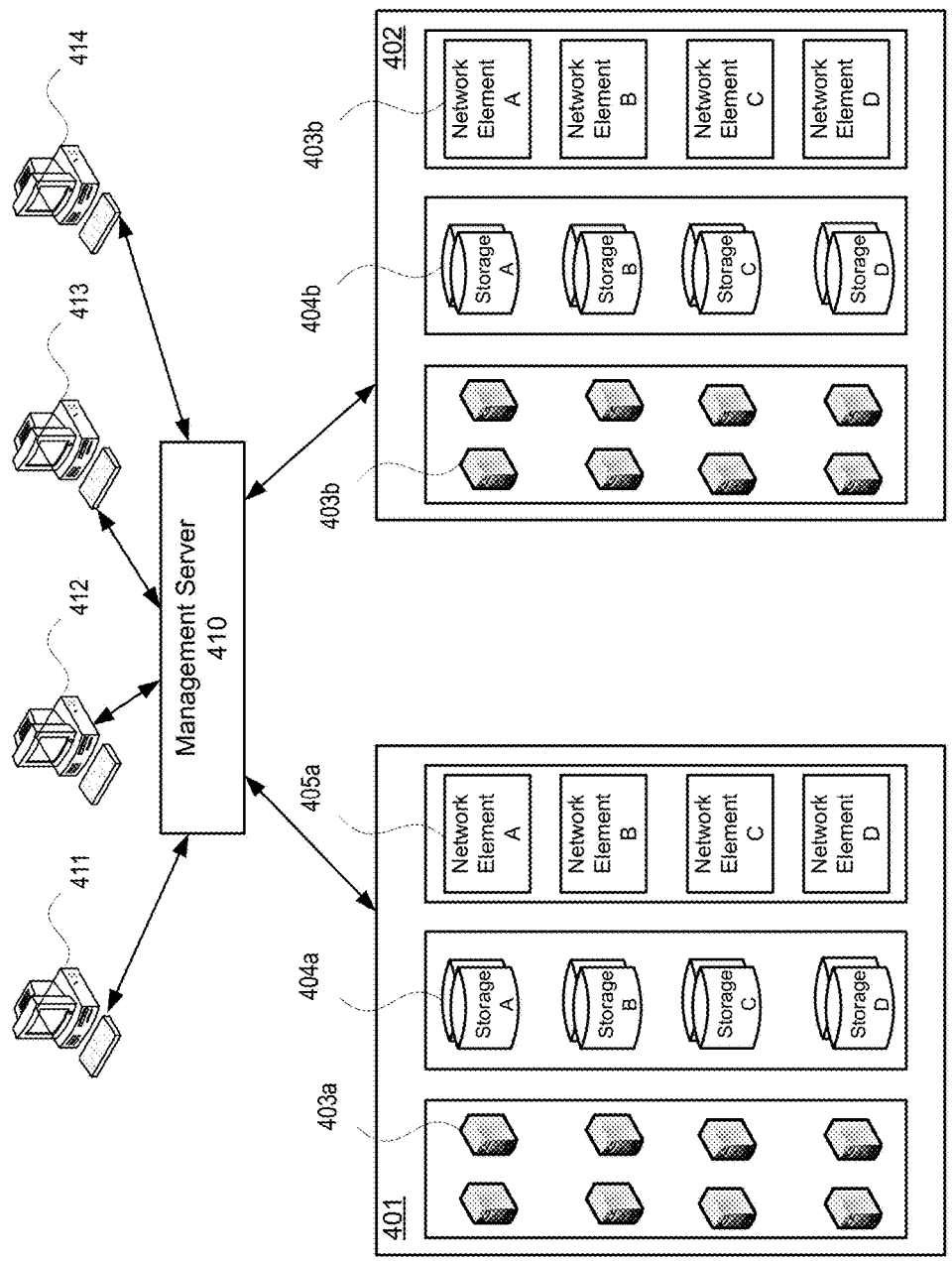
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403, storage resources 404, and network resources 405) of the cloud system.

Management server 410 may be implemented on one or more physical servers. The management server 410 may run, for example, CLOUDSTACK by Citrix Systems, Inc. of Ft. Lauderdale, Fla., or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system. For example, the management server 410 may provide a set of application programming interfaces (APIs) and/or one or more cloud operator console applications (e.g., web-based on standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management sever 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

Enterprise Mobility Management Architecture

Figure 5:
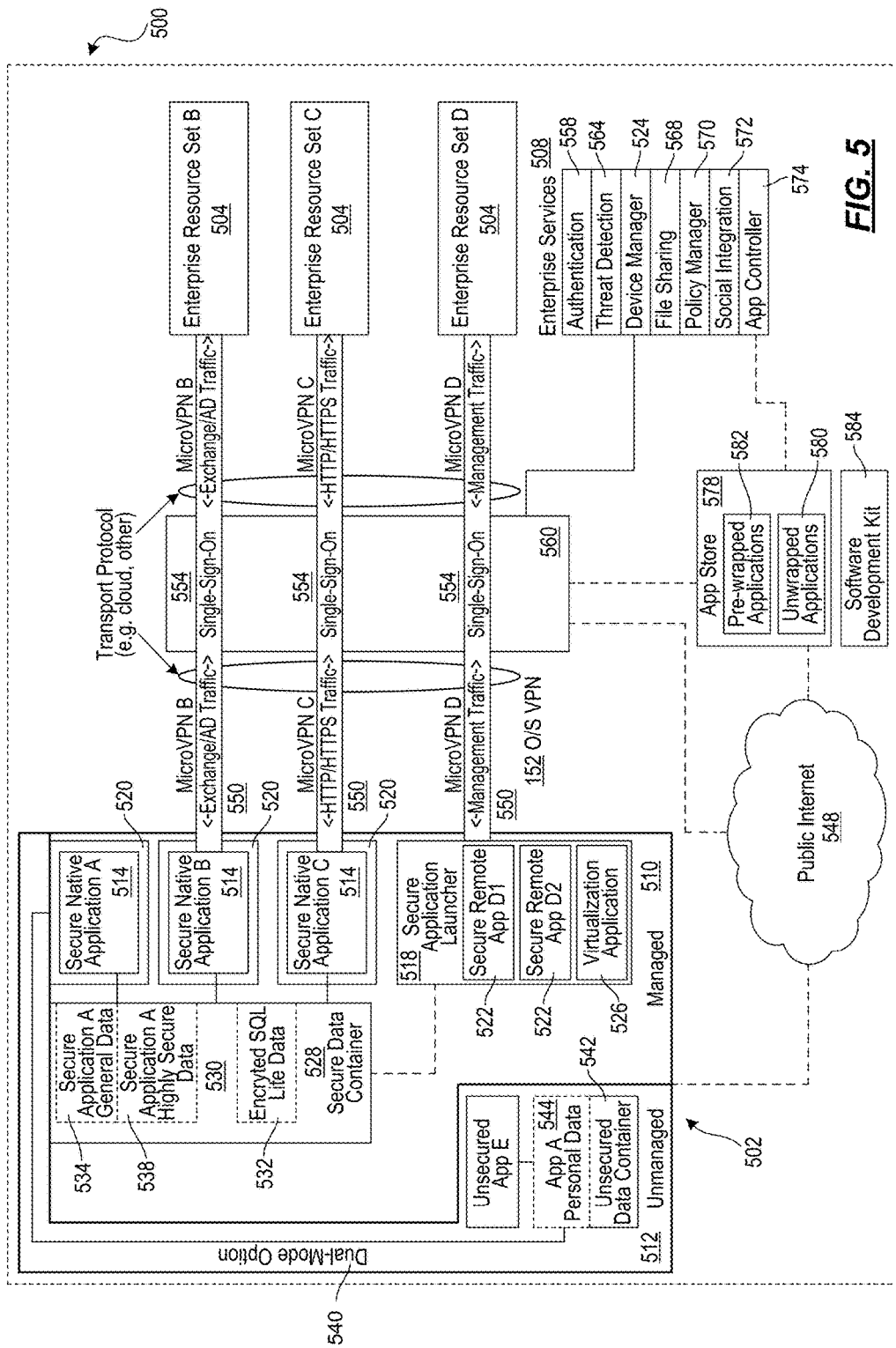
FIG. 5 depicts an illustrative enterprise mobility management system.

FIG. 5 represents an enterprise mobility technical architecture 500 for use in a BYOD environment. The architecture enables a user of a mobile device 502 to both access enterprise or personal resources from a mobile device 502 and use the mobile device 502 for personal use. The user may access such enterprise resources 504 or enterprise services 508 using a mobile device 502 that is purchased by the user or a mobile device 502 that is provided by the enterprise to user. The user may utilize the mobile device 502 for business use only or for business and personal use. The mobile device may run an iOS operating system, an Android operating system, or the like. The enterprise may choose to implement policies to manage the mobile device 504. The policies may be implanted through a firewall or gateway in such a way that the mobile device may be identified, secured or security verified, and provided selective or full access to the enterprise resources. The policies may be mobile device management policies, mobile application management policies, mobile data management policies, or some combination of mobile device, application, and data management policies. A mobile device 504 that is managed through the application of mobile device management policies may be referred to as an enrolled device.

In some embodiments, the operating system of the mobile device may be separated into a managed partition 510 and an unmanaged partition 512. The managed partition 510 may have policies applied to it to secure the applications running on and data stored in the managed partition. The applications running on the managed partition may be secure applications. In other embodiments, all applications may execute in accordance with a set of one or more policy files received separate from the application, and which define one or more security parameters, features, resource restrictions, and/or other access controls that are enforced by the mobile device management system when that application is executing on the device. By operating in accordance with their respective policy file(s), each application may be allowed or restricted from communications with one or more other applications and/or resources, thereby creating a virtual partition. Thus, as used herein, a partition may refer to a physically partitioned portion of memory (physical partition), a logically partitioned portion of memory (logical partition), and/or a virtual partition created as a result of enforcement of one or more policies and/or policy files across multiple apps as described herein (virtual partition). Stated differently, by enforcing policies on managed apps, those apps may be restricted to only be able to communicate with other managed apps and trusted enterprise resources, thereby creating a virtual partition that is impenetrable by unmanaged apps and devices.

The secure applications may be email applications, web browsing applications, software-as-a-service (SaaS) access applications, Windows Application access applications, and the like. The secure applications may be secure native applications 514, secure remote applications 522 executed by a secure application launcher 518, virtualization applications 526 executed by a secure application launcher 518, and the like. The secure native applications 514 may be wrapped by a secure application wrapper 520. The secure application wrapper 520 may include integrated policies that are executed on the mobile device 502 when the secure native application is executed on the device. The secure application wrapper 520 may include meta-data that points the secure native application 514 running on the mobile device 502 to the resources hosted at the enterprise that the secure native application 514 may require to complete the task requested upon execution of the secure native application 514. The secure remote applications 522 executed by a secure application launcher 518 may be executed within the secure application launcher application 518. The virtualization applications 526 executed by a secure application launcher 518 may utilize resources on the mobile device 502, at the enterprise resources 504, and the like. The resources used on the mobile device 502 by the virtualization applications 526 executed by a secure application launcher 518 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 504, and the like. The resources used at the enterprise resources 504 by the virtualization applications 526 executed by a secure application launcher 518 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application may record user interactions associated with a graphical user interface (GUI) and communicate them to a server application where the server application will use the user interaction data as an input to the application operating on the server. In this arrangement, an enterprise may elect to maintain the application on the server side as well as data, files, etc. associated with the application. While an enterprise may elect to "mobilize" some applications in accordance with the principles herein by securing them for deployment on the mobile device, this arrangement may also be elected for certain applications. For example, while some applications may be secured for use on the mobile device, others might not be prepared or appropriate for deployment on the mobile device so the enterprise may elect to provide the mobile user access to the unprepared applications through virtualization techniques. As another example, the enterprise may have large complex applications with large and complex data sets (e.g., material resource planning applications) where it would be very difficult, or otherwise undesirable, to customize the application for the mobile device so the enterprise may elect to provide access to the application through virtualization techniques. As yet another example, the enterprise may have an application that maintains highly secured data (e.g., human resources data, customer data, engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the mobile device as well as a virtualization application to allow access to applications that are deemed more properly operated on the server side. In an embodiment, the virtualization application may store some data, files, etc. on the mobile phone in one of the secure storage locations. An enterprise, for example, may elect to allow certain information to be stored on the phone while not permitting other information.

In connection with the virtualization application, as described herein, the mobile device may have a virtualization application that is designed to present GUIs and then record user interactions with the GUI. The application may communicate the user interactions to the server side to be used by the server side application as user interactions with the application. In response, the application on the server side may transmit back to the mobile device a new GUI. For example, the new GUI may be a static page, a dynamic page, an animation, or the like, thereby providing access to remotely located resources.

The secure applications may access data stored in a secure data container 528 in the managed partition 510 of the mobile device. The data secured in the secure data container may be accessed by the secure wrapped applications 514, applications executed by a secure application launcher 522, virtualization applications 526 executed by a secure application launcher 522, and the like. The data stored in the secure data container 528 may include files, databases, and the like. The data stored in the secure data container 528 may include data restricted to a specific secure application 530, shared among secure applications 532, and the like. Data restricted to a secure application may include secure general data 534 and highly secure data 538. Secure general data may use a strong form of encryption such as Advanced Encryption Standard (AES) 128-bit encryption or the like, while highly secure data 538 may use a very strong form of encryption such as AES 256-bit encryption. Data stored in the secure data container 528 may be deleted from the device upon receipt of a command from the device manager 524. The secure applications may have a dual-mode option 540. The dual mode option 540 may present the user with an option to operate the secured application in an unsecured or unmanaged mode. In an unsecured or unmanaged mode, the secure applications may access data stored in an unsecured data container 542 on the unmanaged partition 512 of the mobile device 502. The data stored in an unsecured data container may be personal data 544. The data stored in an unsecured data container 542 may also be accessed by unsecured applications 548 that are running on the unmanaged partition 512 of the mobile device 502. The data stored in an unsecured data container 542 may remain on the mobile device 502 when the data stored in the secure data container 528 is deleted from the mobile device 502. An enterprise may want to delete from the mobile device selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

The mobile device may connect to enterprise resources 504 and enterprise services 508 at an enterprise, to the public Internet 548, and the like. The mobile device may connect to enterprise resources 504 and enterprise services 508 through virtual private network connections. The virtual private network connections, also referred to as microVPN or application-specific VPN, may be specific to particular applications 550, particular devices, particular secured areas on the mobile device, and the like 552. For example, each of the wrapped applications in the secured area of the phone may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, HyperText Transfer Protocol (HTTP) traffic, HyperText Transfer Protocol Secure (HTTPS) traffic, application management traffic, and the like. The virtual private network connections may support and enable single-sign-on authentication processes 554. The single-sign-on processes may allow a user to provide a single set of authentication credentials, which are then verified by an authentication service 558. The authentication service 558 may then grant to the user access to multiple enterprise resources 504, without requiring the user to provide authentication credentials to each individual enterprise resource 504.

The virtual private network connections may be established and managed by an access gateway 560. The access gateway 560 may include performance enhancement features that manage, accelerate, and improve the delivery of enterprise resources 504 to the mobile device 502. The access gateway may also re-route traffic from the mobile device 502 to the public Internet 548, enabling the mobile device 502 to access publicly available and unsecured applications that run on the public Internet 548. The mobile device may connect to the access gateway via a transport network 562. The transport network 562 may be a wired network, wireless network, cloud network, local area network, metropolitan area network, wide area network, public network, private network, and the like.

The enterprise resources 504 may include email servers, file sharing servers, SaaS applications, Web application servers, Windows application servers, and the like. Email servers may include Exchange servers, Lotus Notes servers, and the like. File sharing servers may include ShareFile servers, and the like. SaaS applications may include Salesforce, and the like. Windows application servers may include any application server that is built to provide applications that are intended to run on a local Windows operating system, and the like. The enterprise resources 504 may be premise-based resources, cloud based resources, and the like. The enterprise resources 504 may be accessed by the mobile device 502 directly or through the access gateway 560. The enterprise resources 504 may be accessed by the mobile device 502 via a transport network 562. The transport network 562 may be a wired network, wireless network, cloud network, local area network, metropolitan area network, wide area network, public network, private network, and the like.

The enterprise services 508 may include authentication services 558, threat detection services 564, device manager services 524, file sharing services 568, policy manager services 570, social integration services 572, application controller services 574, and the like. Authentication services 558 may include user authentication services, device authentication services, application authentication services, data authentication services and the like. Authentication services 558 may use certificates. The certificates may be stored on the mobile device 502, by the enterprise resources 504, and the like. The certificates stored on the mobile device 502 may be stored in an encrypted location on the mobile device, the certificate may be temporarily stored on the mobile device 502 for use at the time of authentication, and the like. Threat detection services 564 may include intrusion detection services, unauthorized access attempt detection services, and the like. Unauthorized access attempt detection services may include unauthorized attempts to access devices, applications, data, and the like. Device management services 524 may include configuration, provisioning, security, support, monitoring, reporting, and decommissioning services. File sharing services 568 may include file management services, file storage services, file collaboration services, and the like. Policy manager services 570 may include device policy manager services, application policy manager services, data policy manager services, and the like. Social integration services 572 may include contact integration services, collaboration services, integration with social networks such as Facebook, Twitter, and LinkedIn, and the like. Application controller services 574 may include management services, provisioning services, deployment services, assignment services, revocation services, wrapping services, and the like.

The enterprise mobility technical architecture 500 may include an application store 578. The application store 578 may include unwrapped applications 580, pre-wrapped applications 582, and the like. Applications may be populated in the application store 578 from the application controller 574. The application store 578 may be accessed by the mobile device 502 through the access gateway 560, through the public Internet 548, or the like. The application store may be provided with an intuitive and easy to use User Interface.

A software development kit 584 may provide a user the capability to secure applications selected by the user by wrapping the application as described previously in this description. An application that has been wrapped using the software development kit 584 may then be made available to the mobile device 502 by populating it in the application store 578 using the application controller 574.

The enterprise mobility technical architecture 500 may include a management and analytics capability 588. The management and analytics capability 588 may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Figure 6:
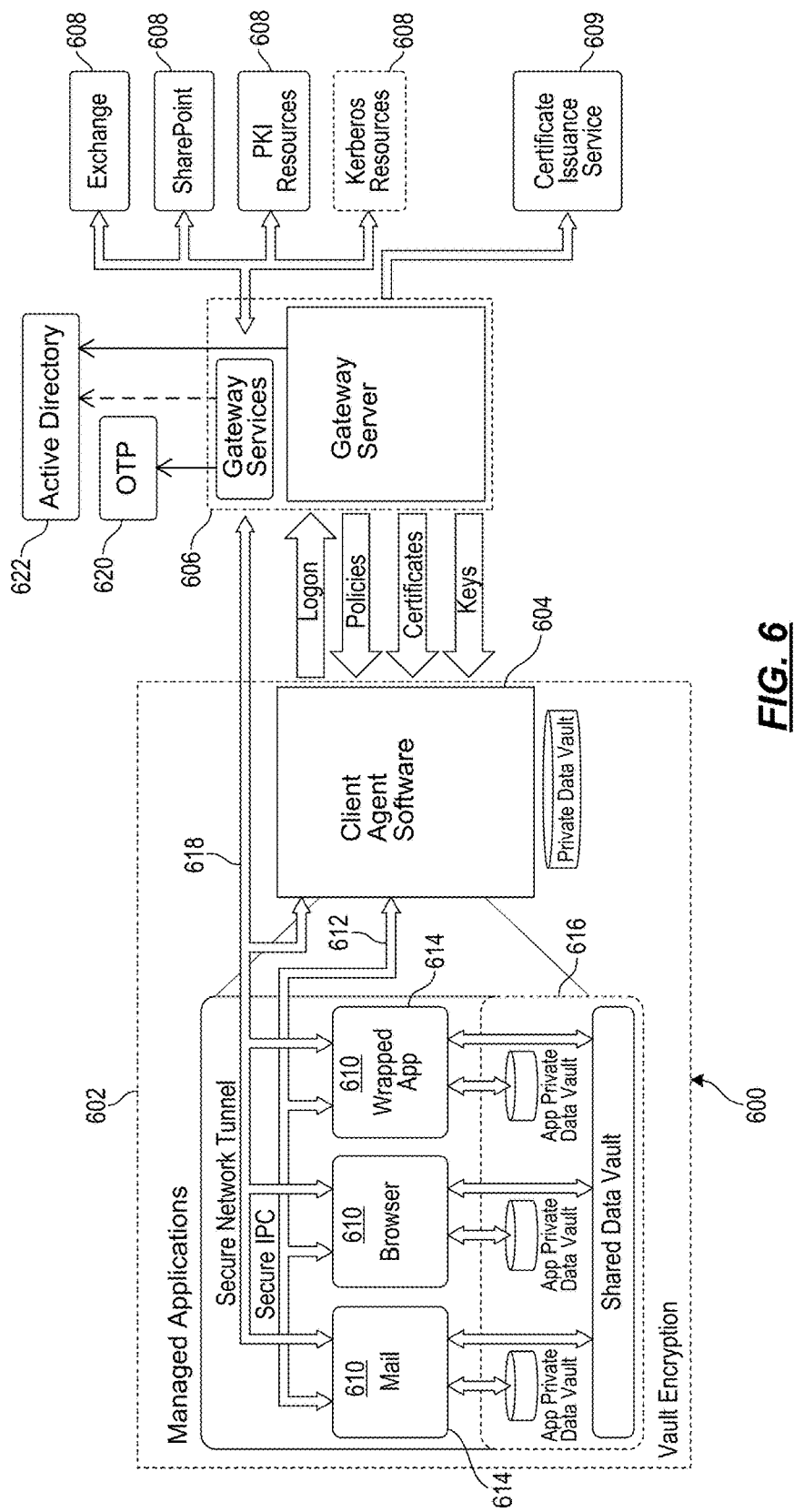
FIG. 6 depicts another illustrative enterprise mobility management system.

FIG. 6 is another illustrative enterprise mobility management system 600. Some of the components of the mobility management system 500 described above with reference to FIG. 5 have been omitted for the sake of simplicity. The architecture of the system 600 depicted in FIG. 6 is similar in many respects to the architecture of the system 500 described above with reference to FIG. 5 and may include additional features not mentioned above.

In this case, the left hand side represents an enrolled mobile device 602 with a client agent 604, which interacts with gateway server 606 (which includes Access Gateway and application controller functionality) to access various enterprise resources 608 and services 609 such as Exchange, Sharepoint, public-key infrastructure (PKI) Resources, Kerberos Resources, Certificate Issuance service, as shown on the right hand side above. Although not specifically shown, the mobile device 602 may also interact with an enterprise application store (StoreFront) for the selection and downloading of applications.

The client agent 604 acts as the UI (user interface) intermediary for Windows apps/desktops hosted in an Enterprise data center, which are accessed using the High-Definition User Experience (HDX)/ICA display remoting protocol. The client agent 604 also supports the installation and management of native applications on the mobile device 602, such as native iOS or Android applications. For example, the managed applications 610 (mail, browser, wrapped application) shown in the figure above are all native applications that execute locally on the device. Client agent 604 and application management framework of this architecture act to provide policy driven management capabilities and features such as connectivity and SSO (single sign on) to enterprise resources/services 608. The client agent 604 handles primary user authentication to the enterprise, normally to Access Gateway (AG) with SSO to other gateway server components. The client agent 604 obtains policies from gateway server 606 to control the behavior of the managed applications 610 on the mobile device 602.

The Secure interprocess communication (IPC) links 612 between the native applications 610 and client agent 604 represent a management channel, which allows client agent to supply policies to be enforced by the application management framework 614 "wrapping" each application. The IPC channel 612 also allows client agent 604 to supply credential and authentication information that enables connectivity and SSO to enterprise resources 608. Finally the IPC channel 612 allows the application management framework 614 to invoke user interface functions implemented by client agent 604, such as online and offline authentication.

Communications between the client agent 604 and gateway server 606 are essentially an extension of the management channel from the application management framework 614 wrapping each native managed application 610. The application management framework 614 requests policy information from client agent 604, which in turn requests it from gateway server 606. The application management framework 614 requests authentication, and client agent 604 logs into the gateway services part of gateway server 606 (also known as NetScaler Access Gateway). Client agent 604 may also call supporting services on gateway server 606, which may produce input material to derive encryption keys for the local data vaults 616, or provide client certificates which may enable direct authentication to PKI protected resources, as more fully explained below.

In more detail, the application management framework 614 "wraps" each managed application 610. This may be incorporated via an explicit build step, or via a post-build processing step. The application management framework 614 may "pair" with client agent 604 on first launch of an application 610 to initialize the Secure IPC channel and obtain the policy for that application. The application management framework 614 may enforce relevant portions of the policy that apply locally, such as the client agent login dependencies and some of the containment policies that restrict how local OS services may be used, or how they may interact with the application 610.

The application management framework 614 may use services provided by client agent 604 over the Secure IPC channel 612 to facilitate authentication and internal network access. Key management for the private and shared data vaults 616 (containers) may be also managed by appropriate interactions between the managed applications 610 and client agent 604. Vaults 616 may be available only after online authentication, or may be made available after offline authentication if allowed by policy. First use of vaults 616 may require online authentication, and offline access may be limited to at most the policy refresh period before online authentication is again required.

Network access to internal resources may occur directly from individual managed applications 610 through Access Gateway 606. The application management framework 614 is responsible for orchestrating the network access on behalf of each application 610. Client agent 604 may facilitate these network connections by providing suitable time limited secondary credentials obtained following online authentication. Multiple modes of network connection may be used, such as reverse web proxy connections and end-to-end VPN-style tunnels 618.

The Mail and Browser managed applications 610 have special status and may make use of facilities that might not be generally available to arbitrary wrapped applications. For example, the Mail application may use a special background network access mechanism that allows it to access Exchange over an extended period of time without requiring a full AG logon. The Browser application may use multiple private data vaults to segregate different kinds of data.

This architecture supports the incorporation of various other security features. For example, gateway server 606 (including its gateway services) in some cases will not need to validate active directory (AD) passwords. It can be left to the discretion of an enterprise whether an AD password is used as an authentication factor for some users in some situations. Different authentication methods may be used if a user is online or offline (i.e., connected or not connected to a network).

Step up authentication is a feature wherein gateway server 606 may identify managed native applications 610 that are allowed to have access to highly classified data requiring strong authentication, and ensure that access to these applications is only permitted after performing appropriate authentication, even if this means a re-authentication is required by the user after a prior weaker level of login.

Another security feature of this solution is the encryption of the data vaults 616 (containers) on the mobile device 602. The vaults 616 may be encrypted so that all on-device data including files, databases, and configurations are protected. For on-line vaults, the keys may be stored on the server (gateway server 606), and for off-line vaults, a local copy of the keys may be protected by a user password or biometric validation. When data is stored locally on the device 602 in the secure container 616, it is preferred that a minimum of AES 256 encryption algorithm be utilized.

Other secure container features may also be implemented. For example, a logging feature may be included, wherein all security events happening inside an application 610 are logged and reported to the backend. Data wiping may be supported, such as if the application 610 detects tampering, associated encryption keys may be written over with random data, leaving no hint on the file system that user data was destroyed. Screenshot protection is another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the device is generated using a passphrase or biometric data supplied by the user (if offline access is required). It may be XORed with another key randomly generated and stored on the server side if offline access is not required. Key Derivation functions may operate such that keys generated from the user password use KDFs (key derivation functions, notably Password-Based Key Derivation Function 2 (PBKDF2)) rather than creating a cryptographic hash of it. The latter makes a key susceptible to brute force or dictionary attacks.

Further, one or more initialization vectors may be used in encryption methods. An initialization vector will cause multiple copies of the same encrypted data to yield different cipher text output, preventing both replay and cryptanalytic attacks. This will also prevent an attacker from decrypting any data even with a stolen encryption key if the specific initialization vector used to encrypt the data is not known. Further, authentication then decryption may be used, wherein application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented, wherein after a policy-defined period of inactivity, a user session is terminated.

Data leakage from the application management framework 614 may be prevented in other ways. For example, when an application 610 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

Another security feature relates to the use of an OTP (one time password) 620 without the use of an AD (active directory) 622 password for access to one or more applications. In some cases, some users do not know (or are not permitted to know) their AD password, so these users may authenticate using an OTP 620 such as by using a hardware OTP system like SecurID (OTPs may be provided by different vendors also, such as Entrust or Gemalto). In some cases, after a user authenticates with a user ID, a text is sent to the user with an OTP 620. In some cases, this may be implemented only for online use, with a prompt being a single field.

An offline password may be implemented for offline authentication for those applications 610 for which offline use is permitted via enterprise policy. For example, an enterprise may want StoreFront to be accessed in this manner. In this case, the client agent 604 may require the user to set a custom offline password and the AD password is not used. Gateway server 606 may provide policies to control and enforce password standards with respect to the minimum length, character class composition, and age of passwords, such as described by the standard Windows Server password complexity requirements, although these requirements may be modified.

Another feature relates to the enablement of a client side certificate for certain applications 610 as secondary credentials (for the purpose of accessing PKI protected web resources via the application management framework micro VPN feature). For example, an application may utilize such a certificate. In this case, certificate-based authentication using ActiveSync protocol may be supported, wherein a certificate from the client agent 604 may be retrieved by gateway server 606 and used in a keychain. Each managed application may have one associated client certificate, identified by a label that is defined in gateway server 606.

Gateway server 606 may interact with an Enterprise special purpose web service to support the issuance of client certificates to allow relevant managed applications to authenticate to internal PKI protected resources.

The client agent 604 and the application management framework 614 may be enhanced to support obtaining and using client certificates for authentication to internal PKI protected network resources. More than one certificate may be supported, such as to match various levels of security and/or separation requirements. The certificates may be used by the Mail and Browser managed applications, and ultimately by arbitrary wrapped applications (provided those applications use web service style communication patterns where it is reasonable for the application management framework to mediate https requests).

Application management client certificate support on iOS may rely on importing a public-key cryptography standards (PKCS) 12 BLOB (Binary Large Object) into the iOS keychain in each managed application for each period of use. Application management framework client certificate support may use a HTTPS implementation with private in-memory key storage. The client certificate will never be present in the iOS keychain and will not be persisted except potentially in "online-only" data value that is strongly protected.

Mutual SSL may also be implemented to provide additional security by requiring that a mobile device 602 is authenticated to the enterprise, and vice versa. Virtual smart cards for authentication to gateway server 606 may also be implemented.

Both limited and full Kerberos support may be additional features. The full support feature relates to an ability to do full Kerberos login to Active Directory (AD) 622, using an AD password or trusted client certificate, and obtain Kerberos service tickets to respond to HTTP Negotiate authentication challenges. The limited support feature relates to constrained delegation in Citrix Access Gateway Enterprise Edition (AGEE), where AGEE supports invoking Kerberos protocol transition so it can obtain and use Kerberos service tickets (subject to constrained delegation) in response to HTTP Negotiate authentication challenges. This mechanism works in reverse web proxy (aka corporate virtual private network (CVPN)) mode, and when http (but not https) connections are proxied in VPN and MicroVPN mode.

Another feature relates to application container locking and wiping, which may automatically occur upon jail-break or rooting detections, and occur as a pushed command from administration console, and may include a remote wipe functionality even when an application 610 is not running.

A multi-site architecture or configuration of enterprise application store and an application controller may be supported that allows users to be service from one of several different locations in case of failure.

In some cases, managed applications 610 may be allowed to access a certificate and private key via an API (example OpenSSL). Trusted managed applications 610 of an enterprise may be allowed to perform specific Public Key operations with an application's client certificate and private key. Various use cases may be identified and treated accordingly, such as when an application behaves like a browser and no certificate access is required, when an application reads a certificate for "who am I," when an application uses the certificate to build a secure session token, and when an application uses private keys for digital signing of important data (e.g. transaction log) or for temporary data encryption.

Using Derived Credentials for Enrollment with Enterprise Mobile Device Management Services Having discussed several examples of the computing architecture that may be used in providing and/or implementing various aspects of the disclosure, a number of embodiments will now be discussed in greater detail. In particular, and as introduced above, some aspects of the disclosure generally relate to enrolling a mobile computing device with an enterprise mobile device management system using derived credentials. In the description below, various examples illustrating how a mobile computing device may be enrolled with an enterprise mobile device management system in accordance with one or more embodiments will be discussed.

Figure 7:
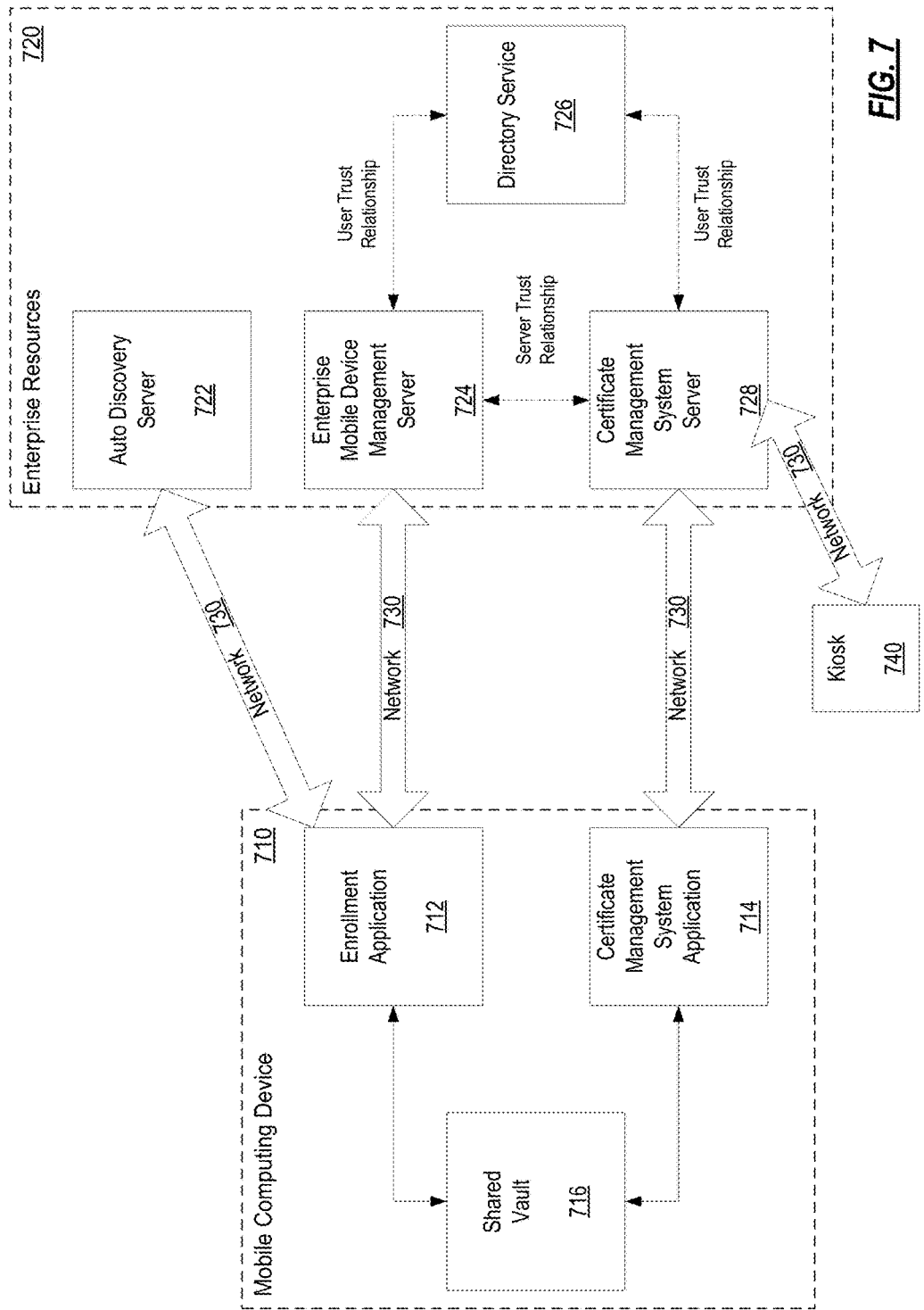
FIG. 7 depicts an illustrative system architecture in which a mobile computing device may enroll with an enterprise mobile device management server, according to one or more illustrative aspects described herein.

FIG. 7 depicts an illustrative system architecture in which a mobile computing device 710 may enroll with an enterprise mobile device management server 724 in order to access enterprise resources 720. The architecture of the system depicted in FIG. 7 is similar in many respects to the architecture of the systems 500 and 600 described above with reference to FIGS. 5 and 6 and may include additional features not mentioned above. Some of the components of the mobility management systems 500 and 600 described above with reference to FIGS. 5 and 6 have been omitted for the sake of simplicity.

The enrollment application 712 may in one embodiment be launched in response to a user command. A user of the mobile computing device 710 may have been instructed to initiate the enrollment process by starting the enrollment application 712. The enrollment application 712 may be configured to prompt the user of the mobile computing device 710 for a username. In some embodiments, the username may comprise the User Principal Name (UPN). The enrollment application 712 may be further configured to prompt the user of the mobile computing device 710 for the network address of the enterprise mobile device management server 724. In some embodiments, the network address of the enterprise mobile device management server 724 may comprise a Uniform Record Locator (URL) address. In other embodiments, the network address of the enterprise mobile device management server 724 may comprise an Internet Protocol (IP) address.

The automatic discovery server 722 may be a single-server or multi-server system, or a cloud-based system, including at least one virtualization server, as described above with reference to FIG. 4. The enrollment application 712 may access the automatic discovery server 722 via a network 730. The network 730 may be a wired network, wireless network, cloud network, local area network, metropolitan area network, wide area network, public network, private network, and the like. The enrollment application 712 may be configured to generate configuration information request messages. The configuration information request messages may comprise the username and/or the network address of the enterprise mobile device management server 724 as provided by the user of the mobile computing device 710. The enrollment application 712 may transmit these configuration information request messages to the automatic discovery server 722 via a network 730. The automatic discovery server 722 may be configured to respond to the configuration information request messages from the enrollment application 712 with a message comprising the configuration information for the enterprise mobile device management server 724. The configuration information may comprise redirection information and/or setup flags to be used to communicate with the enterprise mobile device management server 724. The automatic discovery server 722 may determine its response to the configuration request message based on the username or the network address of the enterprise mobile device management server 724 comprised in the configuration request message.

The enterprise mobile device management server 724 may be a single-server or multi-server system, or a cloud-based system, including at least one virtualization server, as described above with reference to FIG. 4. An example of such a mobile device management server is the XENMOBILE server manufactured by Citrix Systems, Inc., of Fort Lauderdale, Fla. The enrollment application 712 may access the enterprise mobile device management server 724 via a network 730. The enrollment application 712 may be configured to send an enrollment request message to the enterprise mobile device management server 724. In some embodiments, the enrollment application 712 may address the enrollment request message using the network address to the enterprise mobile device management server 724 provided by the user. In other embodiments, the enrollment application 712 may address the enrollment request message using the configuration information received from the automatic discovery server 722. The enterprise mobile device management server 724 may be configured to respond to the enrollment request message with a response message comprising derived credential information, certificate management system application information, and password complexity rule information.

With further reference to FIG. 7, the enrollment application 712 may be configured to prompt the user of the mobile computing device 710 for a user password based on the password complexity rule information comprised in the enrollment request response message received from the enterprise mobile device management server 724. The user password might be a secret or password that is known only to the user of the mobile computing device 710. The user password might not be the user's network or directory service password. The user password may be used to protect the derived credentials stored in the mobile computing device 710, as described in greater detail below. The enrollment application 712 may be configured to derive a password validation value generated from the user password. In some embodiments, the password validation value may be generated using KDFs (key derivation functions, notably Password-Based Key Derivation Function 2 (PBKDF2)) rather than creating a cryptographic hash of the user password. The latter makes a key susceptible to brute force or dictionary attacks. The password-based key value may then be encrypted using a very strong form of encryption such as Advanced Encryption Standard (AES) 256-bit encryption or the like. The enrollment application 712 may store the resulting password validation value in a shared vault 716 on the mobile computing device 710. The enrollment application 712 might not store the user password in the shared vault 716.

The mobile computing device 710 may run an iOS operating system, an Android operating system, or the like. The shared vault 716 may in one embodiment be a shared keychain in an iOS-based mobile computing device; in another embodiment the shared vault 716 may be a shared content provider in an Android-based mobile computing device; and, in yet another embodiment, the shared vault 716 may be a shared data vault as described above with reference to FIG. 6. In some embodiments, all applications that access the shared vault 716, like the enrollment application 712 and the certificate management system application 714, may be digitally signed with the same development signing certificate. Applications that share the same development signing certificate may be allowed to share the data stored in the shared vault 716.

The certificate management system sever 728 may be accessed by the certificate management system application 714 via a network 730. The certificate management system server 728 may be a single-server or multi-server system, or a cloud-based system, including at least one virtualization server, as described above with reference to FIG. 4. The certificate management system can be any one of the following non-exhaustive list of products: MyID manufactured by Intercede Group Plc. of Leicestershire, United Kingdom; or IdentityGuard™ manufactured by the Entrust Datacard Corporation of Minneapolis, Minn. The enrollment application 712 may launch the certificate management system application 714 and cause the mobile computing device 710 to switch control to the certificate management system application 714. As part of the launch command, the enrollment application 712 may provide the user password received from the user of the mobile computing device 710 to the certificate management system application 714. In some embodiments, the enrollment application 712 may launch the certificate management system application 714 by means of a Uniform Resource Locator (URL) address which comprises the user password. The enrollment application 712 may identify the certificate management system application 714 to launch based on the certificate management system application information comprised in the enrollment request response message received from the enterprise mobile device management server 724. If or when the certificate management system application 714 identified by the enrollment application 712 is not installed on the mobile computing device 710, then the enrollment application 712 may be configured to launch an application store (not shown in FIG. 7) on the mobile computing device 710, or access an application store 578 as described above in reference to FIG. 5, and prompt the user of the mobile computing device 710 to install the certificate management system application 714.

The directory service 726 may be single-server or multi-server system, or a cloud-based system, including at least one virtualization server, as described above with reference to FIG. 4. The directory service 726 may be a server configured to authenticate and authorize users and devices in an enterprise, like Microsoft Active Directory, manufactured by the Microsoft Corporation of Redmond, Wash.

The certificate management system application 714 may be configured to authenticate the user of the mobile computing device and the mobile computing device with the certificate management system server 728. The certificate management system application 714 may use at least one or more authentication mechanisms to authenticate with the certificate management system server 728, as required by the enterprise. In one embodiment, the authentication may be performed remotely. In another embodiment, the authentication may be performed in person at a kiosk 740 and may include biometric authentication. In such an embodiment, the kiosk 740 may be equipped with a PIV or CAC card reader, a camera, and biometric sensors (not shown in FIG. 7), as needed, to perform the authentication mechanisms. The authentication mechanisms may verify that the user of the mobile computing device 710 is permitted to possess the derived credentials, in addition to authenticating the user of the mobile computing device 710. The certificate management system server 728 may access the user's information in the directory service 726 to authenticate the user and to verify the user's permissions. The authentication mechanisms described herein should be the same authentication mechanisms that may already in use by the enterprise to effect authentication with PIV or CAC cards in their organization. In other words, the user of the mobile computing device 710 may already be familiar with the authentication mechanisms described in the present enrollment methods and techniques.

After the user has been authenticated, the certificate management system application 714 may request and receive at least one or more derived credentials from the certificate management system server 728. The derived credentials may comprise enrollment credentials, Secure/Multipurpose Internet Mail Extensions (S/MIME) encryption and signing certificates, other network credentials, encryption certificates, signing certificates, and the like. The certificate management system application 714 may be configured to encrypt the received derived credentials using a very strong form of encryption such as Advanced Encryption Standard (AES) 256-bit encryption or the like. The certificate management system application 714 may salt the encryption algorithm with the user password provided by the enrollment application 712 when the certificate management system application 714 was launched. Alternatively, the certificate management system application 714 may be configured to prompt the user of the mobile computing device 710 for the user password. The user password may be validated by the certificate management system application 714 with the password validation value retrieved from the shared vault 716. If or when the user password passes validation, the certificate management system application 714 may store the encrypted derived credentials in the shared vault 716 on the mobile computing device 710. In other embodiments, the certificate management system application 714 may encrypt the derived credentials using a private/public key pair, prior to storing the derived credentials in the shared vault 716 on the mobile computing device 710.

In some embodiments, the certificate management system application 714 may authenticate to the certificate management system server 728 and store the derived credentials in the shared vault 716 prior to starting the present enrollment methods and techniques. In such an embodiment, the user of the mobile computing device 710 may complete the authentication mechanisms described above and cause the certificate management system application 714 to store the derived credentials in the shared vault 716 prior to launching the enrollment application 712.

After the certificate management system application 714 has stored the derived credentials in the shared vault 716, the certificate management system application 714 may cause the mobile computing device 710 to switch control back to the enrollment application 712. The enrollment application 712 may be configured to send a message to the enterprise mobile device management server 724 requesting the type of derived credentials needed to complete enrollment. In response to the request, the enterprise mobile device management server 724 may be configured to send a message comprising information on the type of derived credentials needed to complete enrollment. The enrollment application 712 may be configured to retrieve a link to the derived credentials from the shared vault 716. The enrollment application 712 may use the user password provided by the user of the mobile computing device 710 to decrypt the encrypted derived credentials from the shared vault 716. Alternatively, the enrollment application 712 may prompt the user of the mobile computing device 710 for the user password if or when the enrollment application 712 does not have the user password. For example, the enrollment application 712 may no longer have the user password because the user of the mobile computing device 710 may have inadvertently stopped and restarted the enrollment application 712. The enrollment application 712 may be configured to present the derived credentials to the enterprise mobile device management server 724. The enterprise mobile device management server 724 may be configured to validate the derived credentials. The enterprise mobile device management server 724 may communicate with the certificate management system server 728 to verify the validity of the derived credentials for the mobile computing device 710. The enterprise mobile device management server 724 may also communicate with the directory service 726 to verify the validity of the user of the mobile computing device 710. In some embodiments, the enrollment flow may require that the enrollment application 712 provide additional derived credentials to the enterprise mobile device management server 724. In such embodiments, the enrollment application 712 may retrieve and decrypt additional derived credentials from the shared vault 716 and provide the additional derived credentials to the enterprise mobile device management server 724. For example, the enterprise mobile device management server 724 may require one set of derived credentials to complete mobile device management enrollment and may require a different set of derived credentials to complete mobile application management enrollment. In other embodiments, the enterprise mobile device management server 724 may extract the username from the derived credentials provided by the enrollment application 712 rather than requesting the username from the enrollment application 712.

Once validation of the derived credentials is completed, the enrollment flow may complete without the need for the user of the mobile computing device 710 to provide any further credentials. The enrollment application 712 may access and configure the natively supported mobile device management (MDM) agent by the operating system of the mobile computing device 710. For example, on an iOS-based mobile computing device, the enrollment application 712 may configure the native MDM agent included with the iOS operating system. The enterprise mobile device management server 724 may also push policies to manage the mobile computing device 710 that are installed by the enrollment application 712, as determined by the enterprise. The policies may be mobile device management policies, mobile application management policies, mobile data management policies, or some combination of mobile device, application, and data management policies. The enterprise mobile device management server 724 may also push applications to be installed on the mobile computing device 710 by the enrollment application 712. As described above, in reference to FIG. 5, these applications may be secure, or containerized, applications or may be unsecure, or unmanaged, applications. Once the enrollment flow has completed, the mobile computing device 710 may be referred to as an enrolled device.

Advantageously, and as illustrated in greater detail above, an enterprise user might not have to know or enter their network or directory service password to enroll their mobile computing device with the enterprise mobile device management server. In addition, the enrollment user experience is enhanced because a PIV or CAC card need not be physically connected to the mobile computing device during enrollment. Furthermore, the enterprise may manage the security of the enterprise resources accessed by the mobile computing device via the enterprise mobile device, application, and data management policies provisioned on the mobile computing device.

FIG. 7 illustrates just one example of a system architecture that may be used, and those of skill in the art will appreciate that the specific system architecture and computing devices used may vary, and are secondary to the functionality that they provide, as further described herein. For example, services provided by the automatic discovery server 722 and the enterprise mobile device management server 724 may be combined on a single server or may be load balanced across a plurality of servers.

Figure 8A:
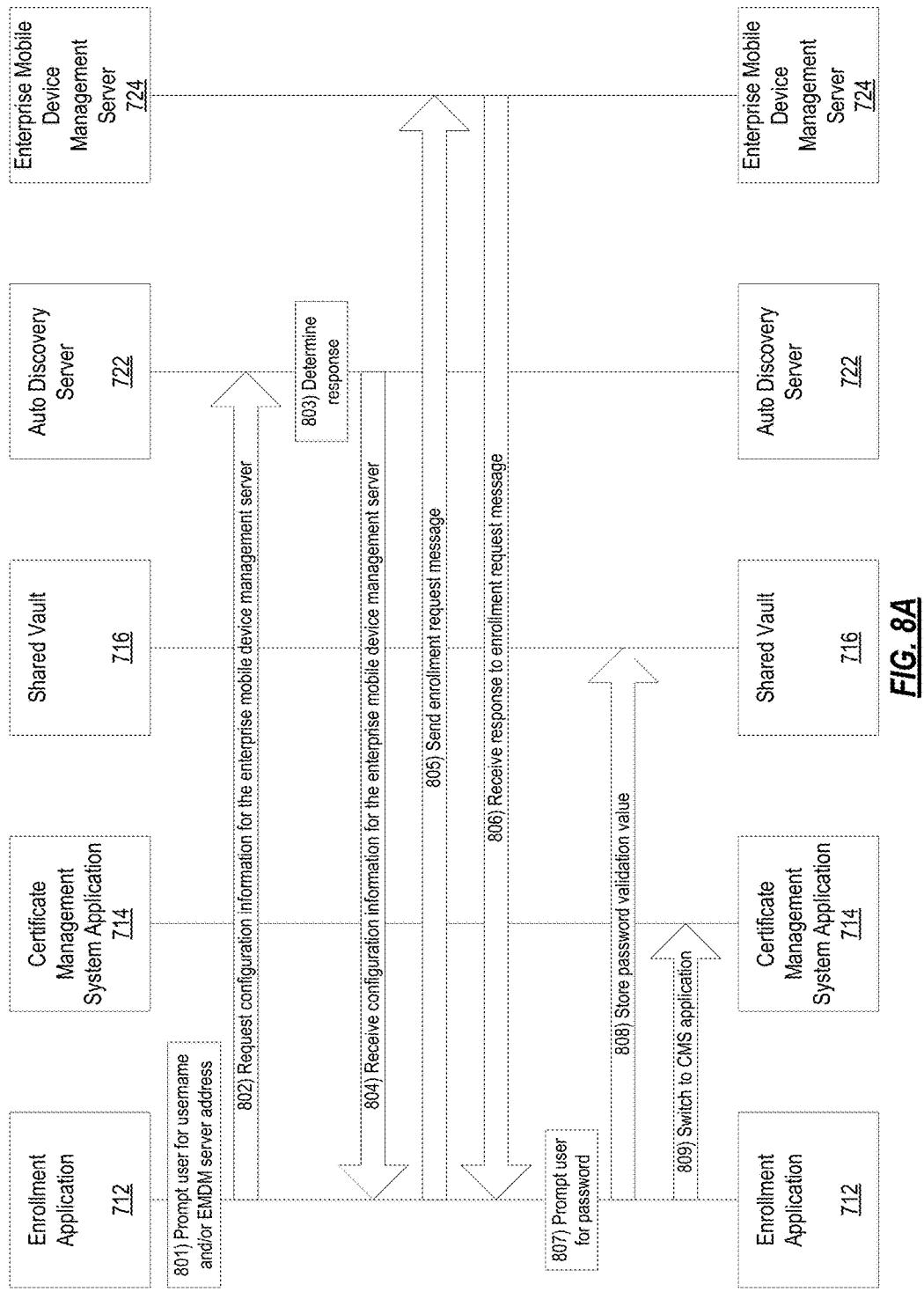
FIGS. 8A-8C depict an example event sequence for providing a method to enroll a mobile computing device with an enterprise mobile device management service using derived credentials in accordance with one or more illustrative aspects described herein.
Figure 8B:
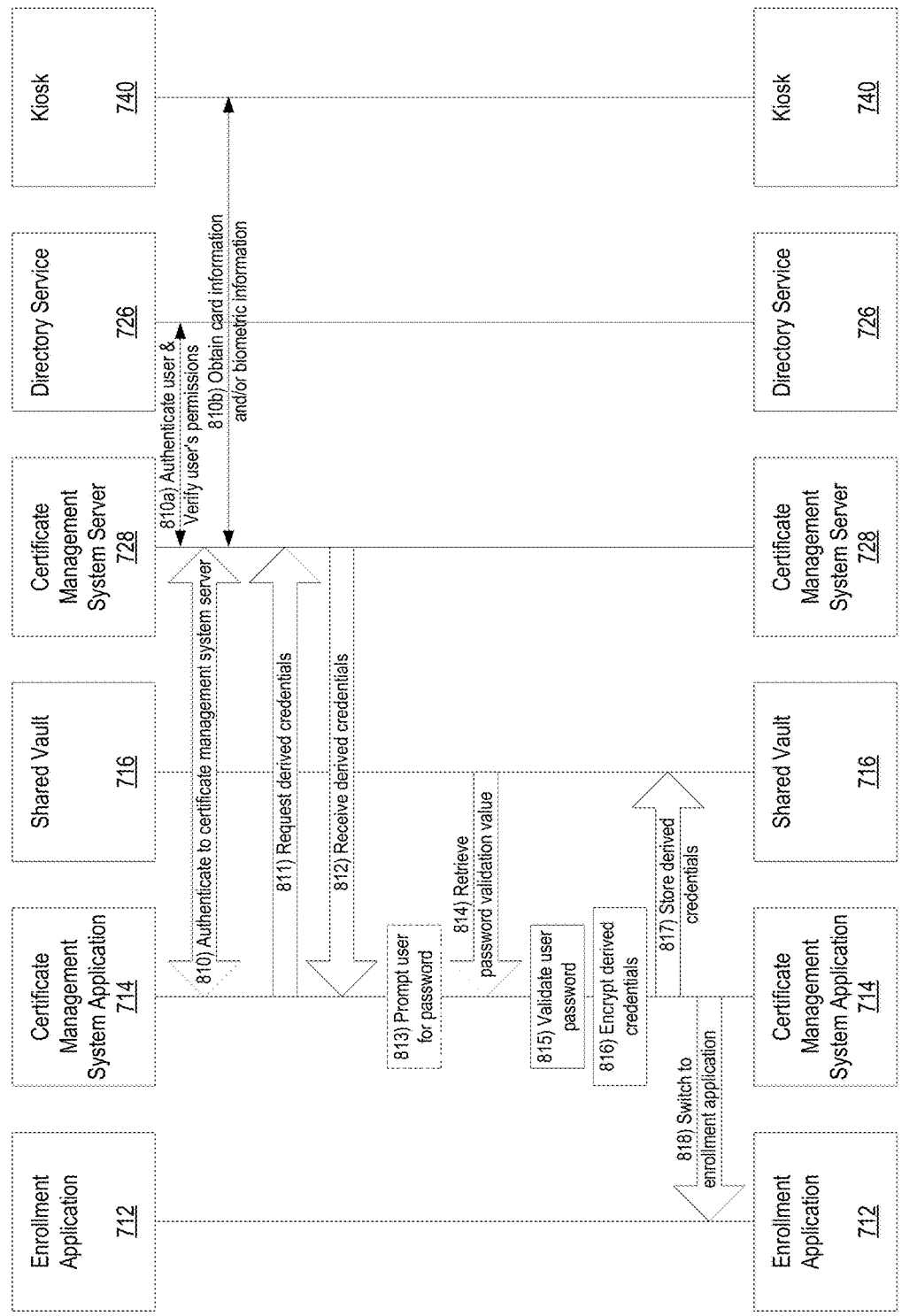
Figure 8C:
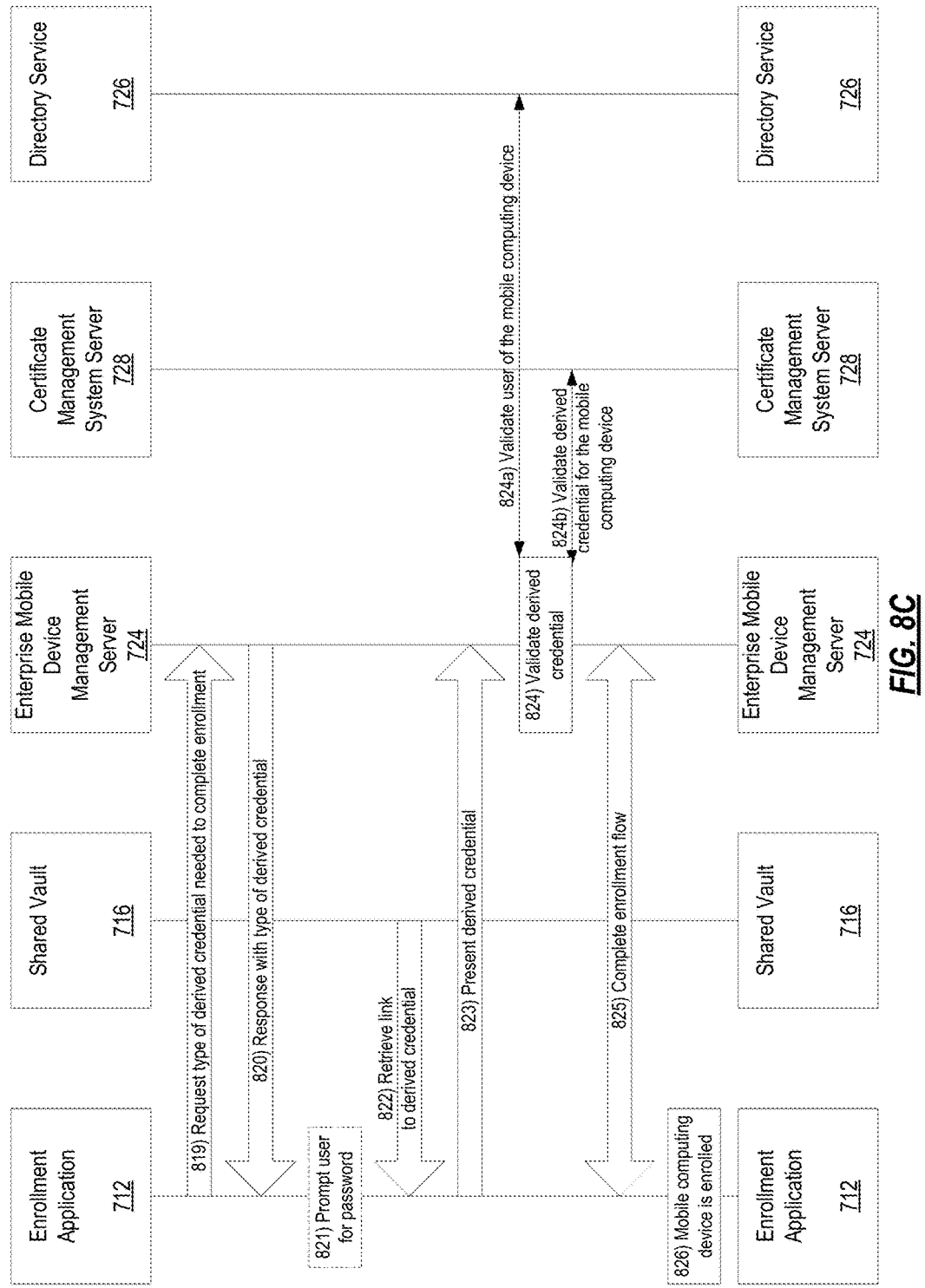

FIGS. 8A-8C depict an example event sequence that illustrates a method of enrolling a mobile computing device with an enterprise mobile device management service using derived credentials. As seen in FIGS. 8A-8C, one or more steps of the depicted example event sequence and other similar examples described herein may be performed in a computing environment such as the system illustrated in FIG. 7, as well as other systems having different architectures (e.g., all or part of FIGS. 1-6). In other embodiments, the method illustrated in FIGS. 8A-8C and/or one or more steps thereof may be embodied in a computer-readable medium, such as a non-transitory computer readable memory.

Referring to FIG. 8A, step 801, the enrollment application 712 may prompt the user of the mobile computing device 710 for a username. The enrollment application 712 may also prompt the user for the network address to the enterprise mobile device management server 724. At step 802, the enrollment application 712 may send a message to the automatic discovery server 722 requesting the configuration information for the enterprise mobile device management server 724. At step 803, the automatic discovery server 722 may determine a response to the request based on the username and/or network address to the enterprise mobile device management server 724 provided by the enrollment application 712. At step 804, the enrollment application 712 may receive the response to the configuration information request message from the automatic discovery server 722 comprising configuration information for the enterprise mobile device management server 724. At step 805, the enrollment application 712 may send an enrollment request message to the enterprise mobile device management server 724. The enrollment request message may comprise the configuration information received from the automatic discovery server 722. At step 806, the enrollment application 712 may receive the response to the enrollment request message from the enterprise mobile device management server 724. The response from the enterprise mobile device management server 724 may comprise derived credential information, certificate management system application information, and password complexity rule information. At step 807, the enrollment application 712 may prompt the user for a password. The enrollment application 712 may validate the user password using the password complexity rule information comprised in the enrollment request response message received from the enterprise mobile device management server 724. If or when, the user password passes validation, the enrollment application 712 may generate a password validation value based on the user password and store the password validation value in the shared vault 716, as shown in step 808. At step 809, the enrollment application 712 may cause the mobile computing device 710 to switch control over to the certificate management system application 714. The enrollment application 712 may identify the certificate management system application 714 to launch based on the certificate management system application information comprised in the enrollment request response message received from the enterprise mobile device management server 724. The enrollment application 712 may also provide the user password to the certificate management system application 714 at step 809.

Referring to FIG. 8B, step 810, the certificate management system application 714 may authenticate the user of the mobile computing device and the mobile computing device with the certificate management system server 728. As part of the authentication step 810, the certificate management system server 728 may access the user's information in the directory service 726 to authenticate the user and to verify the user's permissions as shown in step 810*a*. At step 810*b*, the certificate management system server 728 may also obtain authentication information for the user from a PIV or CAC card and biometric sensors located at a kiosk 740. The authentication mechanism described in step 810 may be the mechanism determined by the enterprise to authenticate enterprise users. At step 811, the certificate management system application 714 may send a message to the certificate management system server 728 requesting derived credentials. At step 812, the certificate management system server 728 may respond to the request providing derived credentials which are then received by the certificate management system application 714. If or when the certificate management system application 714 does not have the user password, the certificate management system application 714 may prompt the user for the user password, as shown in step 813. At step 814, the certificate management system application 714 may retrieve the password validation value from the shared vault 716 and determine the validity of the user password, as show in step 815. At step 816, the certificate management system application 714 may encrypt the derived credentials using the validated user password and store the encrypted derived credentials in the shared vault 716 as shown in step 817. At step 818, the certificate management system application 714 may cause the mobile computing device to switch control back to the enrollment application 712.

Referring to FIG. 8C, step 819, the enrollment application 712 may request the type of derived credentials needed to complete enrollment from the enterprise mobile device management server 724. At step 820, the enterprise mobile device management server 724 may respond to the request providing the type of derived credentials needed to complete enrollment. If or when, the enrollment application 712 does not have the user password, then the enrollment application 712 may prompt the user of the mobile computing device 710 for the user password and validate the user password using the password validation value retrieved from the shared vault 716, as shown in step 821. At step 822, the enrollment application 712 may retrieve a link to the derived credentials from the shared vault 716. At step 823, the enrollment application 712 may present the derived credentials to the enterprise mobile device management server 724. At step 824, the enterprise mobile device management server 724 may validate the derived credentials presented by the enrollment application 712. As part of the validation step 824, the enterprise mobile device management server 724 may communicate with the directory service 726 to verify the validity of the user of the mobile computing device 710, as shown in step 824*a*. In step 824*b*, the enterprise mobile device management server 724 may communicate with the certificate management system server 728 to verify the validity of the derived credentials for the mobile computing device 710. At step 825, the enrollment flow may complete without the need for the user of the mobile computing device 710 to provide any further credentials. The enrollment application 712 may configure mobile device management (MDM) agent native to the operating system of the mobile computing device 710. The enterprise mobile device management server 724 may also push policies to manage the mobile computing device 710 and install applications on the mobile computing device 710. At step 826, the mobile computing device 710 may be referred to as an enrolled device.

Figure 9:
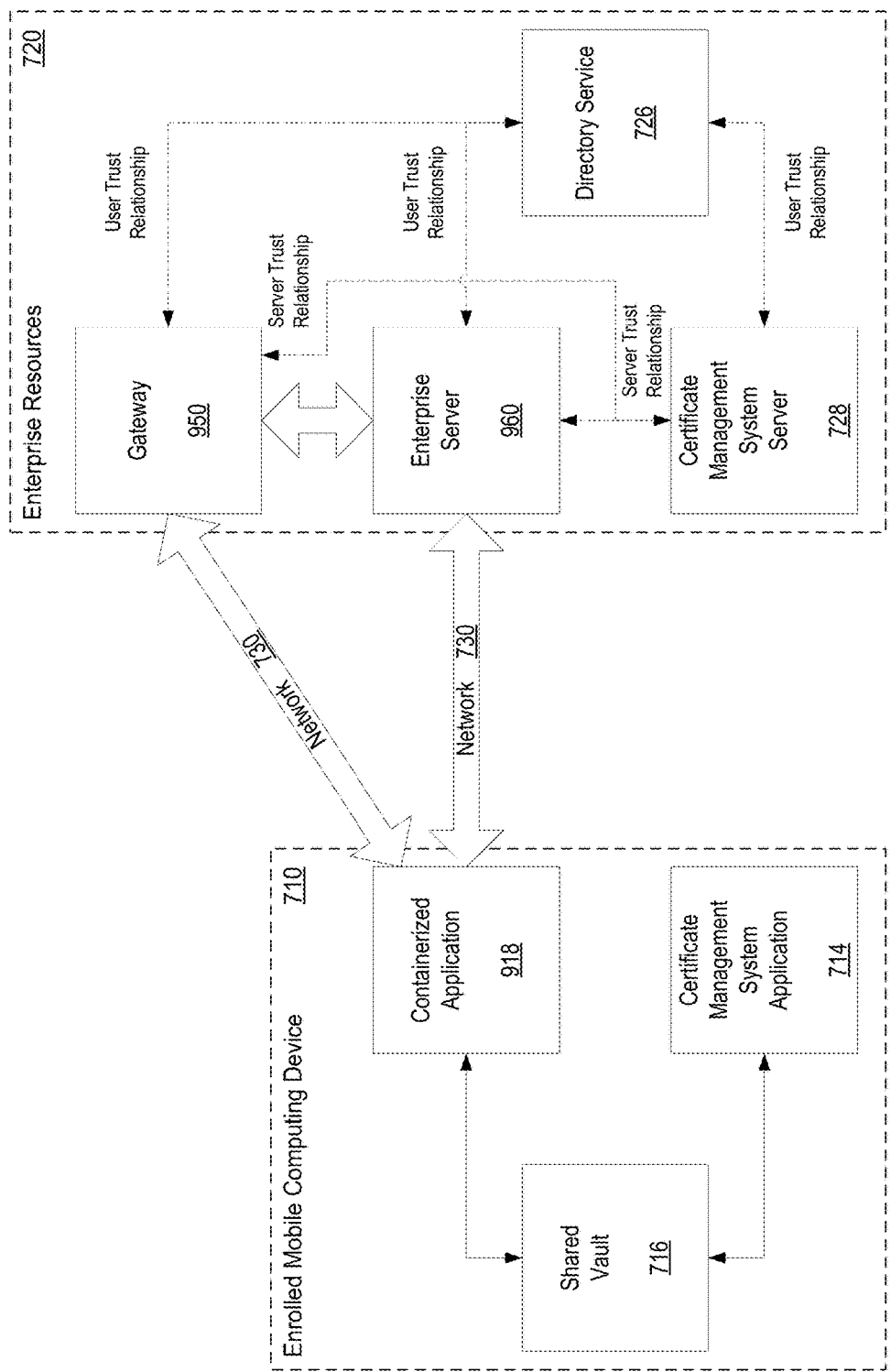
FIG. 9 depicts an illustrative system architecture in which an enrolled mobile computing device may use derived credentials in order to access enterprise resources, according to one or more illustrative aspects described herein.

FIG. 9 depicts an illustrative system architecture in which an enrolled mobile computing device 910 may use derived credentials in order to access enterprise resources 720. The architecture of the system depicted in FIG. 9 is similar in many respects to the architecture of the systems described above with reference to FIGS. 5, 6, and 7, and may include additional features not mentioned above. Some of the components of the mobility management systems described above with reference to FIGS. 5, 6, and 7 have been omitted for the sake of simplicity.

The enrolled mobile computing device 910 may be managed through the application of mobile device management policies as described above with reference to FIGS. 7 and 8A-8C. The containerized application 918 may be a secured, or managed, application as described above with reference to FIG. 5. Thus, the containerized application 918 may be subject to the mobile device management policies enforced by the enrolled mobile computing device 910. The containerized application 918 may be an email application, a web browsing application, a software-as-a-service (SaaS) application, an access application, and the like. The containerized application 918 may be digitally signed with the same development signing certificate as the enrollment application 712 and the certificate management system application 714. Thus, the containerized application 918 may access the password validation value stored in the shared vault 716 by the enrollment application 712 and the derived credentials stored in the shared vault 716 by the certificate management system application 714, as described above with reference to FIGS. 7 and 8A-8C. The containerized application 918 may be configured to prompt the user of the enrolled mobile computing device 910 for the user password. The containerized application 918 may validate the user password using the password validation value retrieved from the shared vault 716. If or when the user password passes validation, the containerized application 918 may retrieve a link to the derived credentials stored in the shared vault 716. The containerized application 918 may access the enterprise resources 720 directly or through the gateway 950.

The gateway 950 may be a single-server or multi-server system, or a cloud-based system, including at least one virtualization server, as described above with reference to FIG. 4. The containerized application 918 may access the gateway 950 via a network 730. The gateway 950 may include performance enhancement features that manage, accelerate, and improve the delivery of enterprise resources 720 to the enrolled mobile computing device 910. An example of such a gateway is the NETSCALER GATEWAY manufactured by Citrix Systems, Inc., of Fort Lauderdale, Fla. The gateway 950 may be configured to require authentication credentials in order to establish a communication connection with the enrolled mobile computing device 910. The containerized application 918 may be configured to retrieve a link to the necessary derived credentials from the shared vault 716 and provide them to the gateway 950 in order to establish a connection to the gateway 950. The gateway 950 may be configured to access the user's information in the directory service 726 to authenticate the user and to verify the user's permissions. The gateway 950 may be further configured to communicate with the certificate management system server 728 to verify the validity of the derived credentials for the enrolled mobile computing device 910. If or when the provided derived credentials are validated by the gateway 950 and the communication connection is established, the containerized application 918 may access enterprise resources 720 via the gateway 950.

The enterprise resources 720 may include email servers, file sharing servers, software-as-a-service (SaaS) application servers, web application servers, access application servers, and the like. The enterprise server 960 may be a single-server or multi-server system, or a cloud-based system, including at least one virtualization server, as described above with reference to FIG. 4. The containerized application 918 may access the enterprise server 960 via a network 730 either directly or via the gateway 950. The enterprise server 960 may be configured to require authentication credentials in order for the containerized application 918 to establish a connection to the enterprise server 960. The enterprise server 960 may be further configured to require additional credentials, signing certificates, encryption certificates, and the like in order to provide resources and functionality to the containerized application 918. The containerized application 918 may be configured to retrieve the necessary derived credentials from the shared vault 716 and present them to the enterprise server 960 as required to access the server resources and provide the necessary functionality. For example, the containerized application 918 may be a secure email application and the enterprise server 960 may be a secure email server. In such a scenario, the secure email server may require authentication credentials in order to authenticate the user of the enrolled mobile computing device 910. The secure email application may also require a signing certificate to digitally sign emails sent to the secure email server for delivery and/or require encryption certificates to encrypt outgoing emails and decrypt incoming emails. Similarly to the gateway 950, the enterprise server may communicate with the directory service 726 and the certificate management system server 728 to authenticate the user of the enrolled mobile computing device 910 and to validate the derived credentials provided by the containerized application 918.

Advantageously, the approach implemented by the present methods and techniques allows an enterprise user to access enterprise resources from their enrolled mobile computing device without the need for the enterprise user to know or enter their network or directory service password. In addition, the PIV or CAC card need not be physically connected to the mobile computing device to obtain access. Furthermore, the mobile computing device is enrolled with the enterprise mobile device management server, thus allowing the enterprise to manage (e.g., via the enterprise mobile device management server) the security of the enterprise resources accessed by the mobile computing device using one or more enterprise mobile device policies, one or more application policies, and/or one or more data management policies defined by the enterprise.

FIG. 9 illustrates one example of a system architecture that may be used, and those of skill in the art will appreciate that the specific system architecture and computing devices used may vary, and are secondary to the functionality that they provide, as further described herein.

Figure 10:
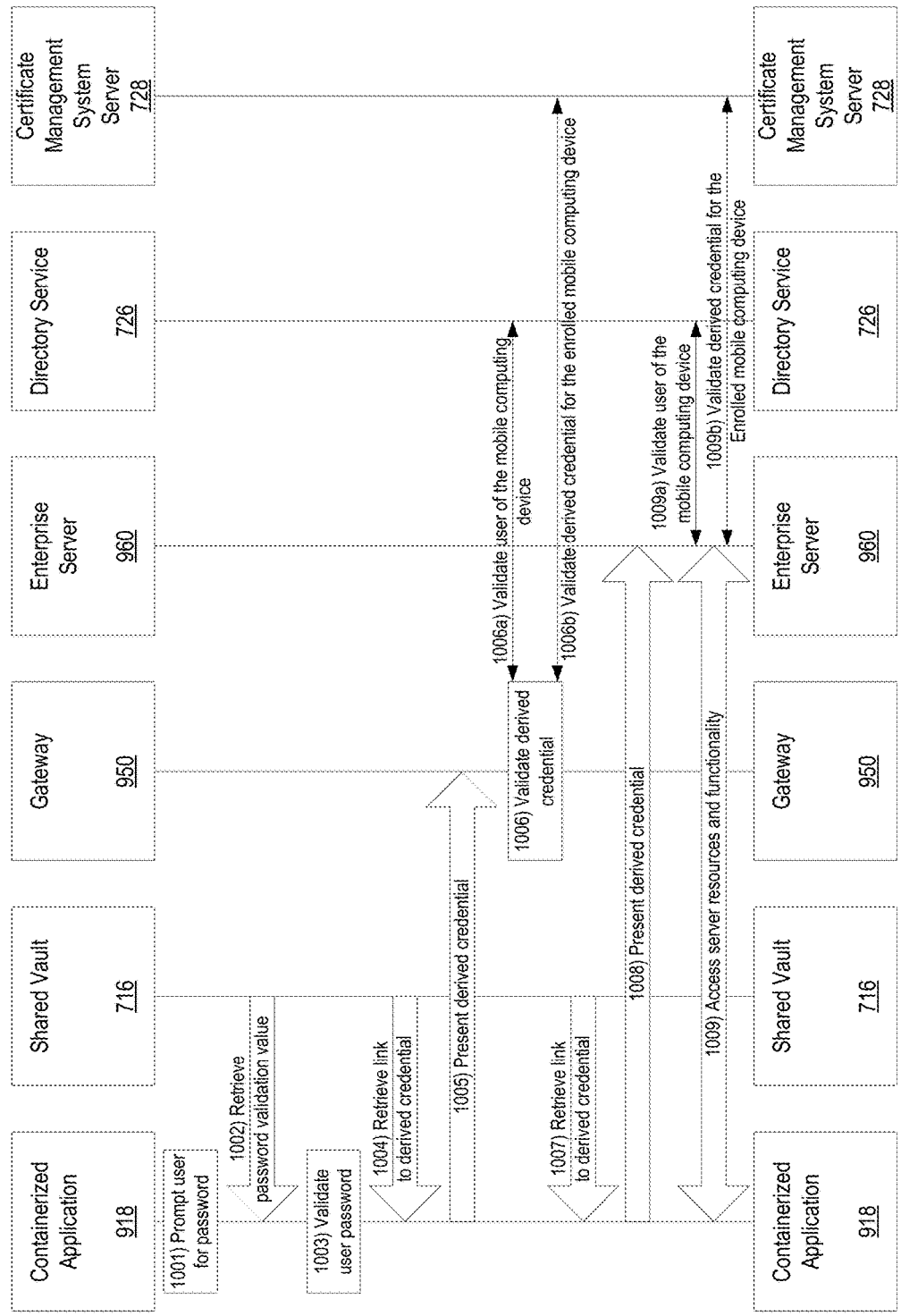
FIG. 10 depicts an example event sequence for providing a method for a containerized application to provide derived credentials to an enterprise server in accordance with one or more illustrative aspects described herein.

FIG. 10 depicts an example event sequence for providing a method for a containerized application 918 to provide derived credentials stored in a shared vault 716 to an enterprise server 960. As seen in FIG. 10, one or more steps of the depicted example event sequence and other similar examples described herein may be performed in a computing environment such as the system illustrated in FIG. 9, in addition to using other systems having different architectures (e.g., all or part of FIGS. 1-7). In other embodiments, the method illustrated in FIG. 10 and/or one or more steps thereof may be embodied in a computer-readable medium, such as a non-transitory computer readable memory.

In further reference to FIG. 10, at step 1001, the containerized application 918 may prompt the user of the mobile computing device 710 for a user password. At step 1002, the containerized application 918 may retrieve the password validation value from the shared vault 716 and determine the validity of the user password, as shown in step 1003. At step 1004, the containerized application 918 may retrieve a link to the derived credential from the shared vault 716. The containerized application 918 may also decrypt the derived credential retrieved from the shared vault 716 using the validated user password. At step 1005, the containerized application 918 may present the decrypted derived credential to the gateway 950 in order to authenticate and establish a communication connection. At step 1006, the gateway 950 may validate the derived credential presented by the containerized application 918. As part of the validation step 1006, the gateway 950 may communicate with the directory service 726 to verify the validity of the user of the enrolled mobile computing device 910, as shown in step 1006a. In step 1006b, the gateway 950 may communicate with the certificate management system server 728 to verify the validity of the derived credentials for the enrolled mobile computing device 910.

Figure 11:
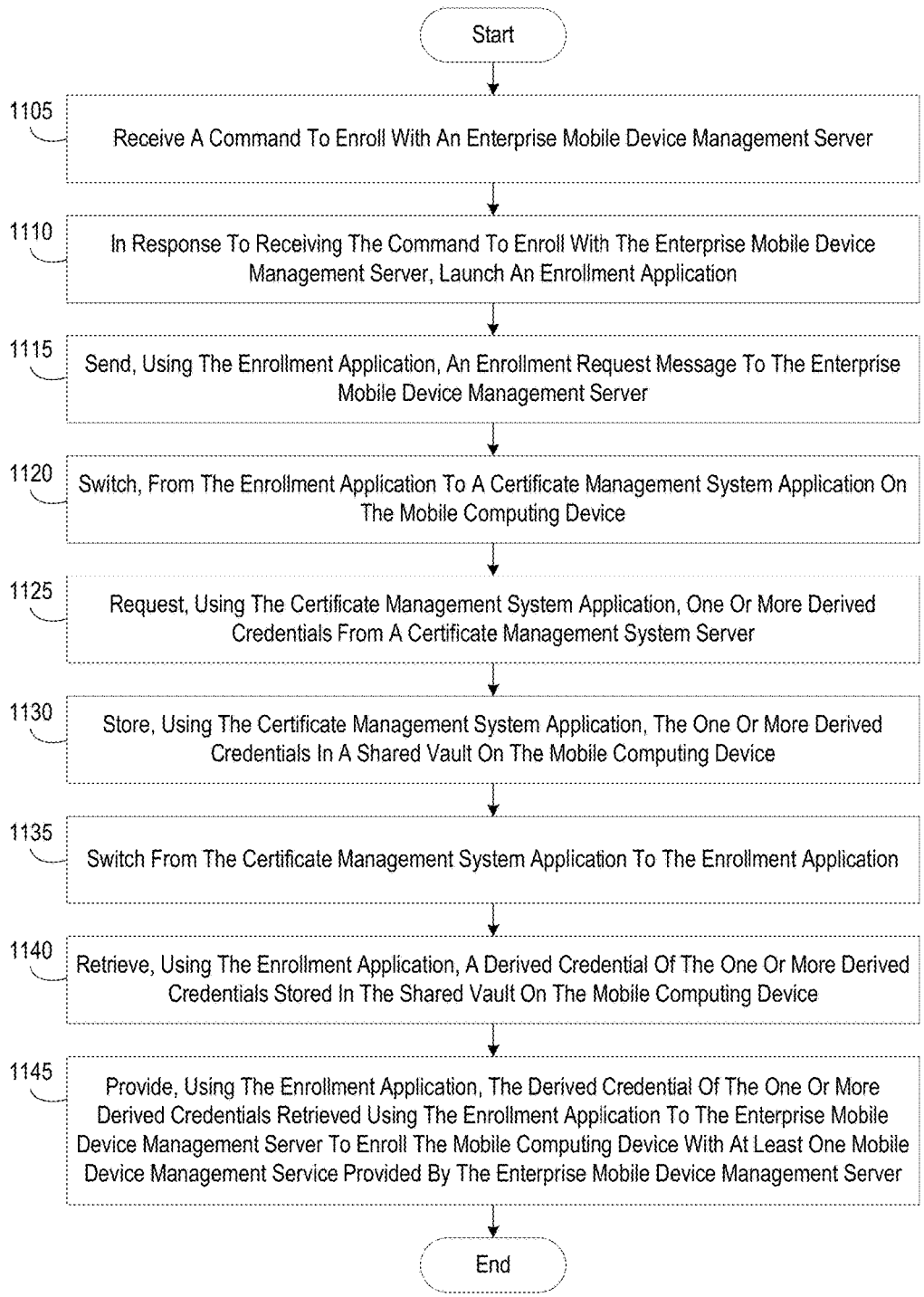
FIG. 11 depicts an example method of using derived credentials for enrollment with enterprise mobile device management services according to one or more illustrative aspects described herein.

Referring to FIG. 10, step 1007, the containerized application 918 may retrieve a link to the derived credential from the shared vault 716 required by the enterprise server 960 to authenticate with and access the functionality of the enterprise server 960. The containerized application 918 may also decrypt the derived credential retrieved from the shared vault 716 using the validated user password. In step 1008, the containerized application 918 may authenticate and obtain access to the enterprise server 960 by presenting the decrypted derived credential to the enterprise server 960, as determined by the enterprise server 960. In step 1009, the containerized application 918 may retrieve additional derived credentials from the shared vault 716 and present them to the enterprise server 960 as required to access the server resources and provide the necessary functionality. As part of step 1009, the enterprise server 960 may communicate with the directory service 726 to verify the validity of the user of the enrolled mobile computing device 910, as shown in step 1009a. In step 1009b, the enterprise server 960 may communicate with the certificate management system server 728 to verify the validity of the derived credentials for the enrolled mobile computing device 910. For example, the containerized application 918 may be a secure email application and the enterprise server 960 may be a secure email server. In such a scenario, the secure email server may require authentication credentials in order to authenticate the user of the enrolled mobile computing device 910. Once authenticated, the secure email application may require additional credentials, such as a signing certificate to digitally sign emails sent to the secure email server for delivery encryption certificates to encrypt outgoing emails and decrypt incoming emails, and the like. As another example, the containerized application 918 may be a secure agent and the enterprise server 960 may be a secure customer relationship management server. The secure agent may present an initial set of derived credentials to the secure customer relationship management server to effect initial authentication and access. Thereafter, the secure customer relationship management server may request additional authentication credentials to provide access to highly secure aspects of the customer relationship management application FIG. 11 depicts an example method of using derived credentials for enrollment with enterprise mobile device management services according to one or more illustrative aspects described herein. Referring to FIG. 11, at step 1105, a mobile computing device may receive a command to enroll with an enterprise mobile device management server. At step 1110, in response to receiving the command to enroll with the enterprise mobile device management server, the mobile computing device may launch an enrollment application. At step 1115, the mobile computing device may send, using the enrollment application, an enrollment request message to the enterprise mobile device management server. At step 1120, the mobile computing device may switch from the enrollment application to a certificate management system application on the mobile computing device. At step 1125, the mobile computing device may request, using the certificate management system application, one or more derived credentials from a certificate management system server. At step 1130, the mobile computing device may store, using the certificate management system application, the one or more derived credentials in a shared vault on the mobile computing device. At step 1135, the mobile computing device may switch from the certificate management system application to the enrollment application. At step 1140, the mobile computing device may retrieve, using the enrollment application, a derived credential of the one or more derived credentials stored in the shared vault on the mobile computing device. At step 1145, the mobile computing device may provide, using the enrollment application, the derived credential of the one or more derived credentials retrieved using the enrollment application to the enterprise mobile device management server to enroll the mobile computing device with at least one mobile device management service provided by the enterprise mobile device management server.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
   requesting, by a mobile computing device and using an enrollment application operating on the mobile computing device, configuration information for a device management server from an automatic discovery service;
   receiving, by the mobile computing device, a message comprising the configuration information for the device management server from the automatic discovery service;
   sending, by the mobile computing device and using the enrollment application, an enrollment request message to device management server, wherein the enrollment request message comprises the configuration information;
   switching control, by the mobile computing device, from the enrollment application to a certificate management system application operating on the mobile computing device;
   requesting, by the mobile computing device and using the certificate management system application, a derived credential from a certificate management system server;
   storing, by the mobile computing device and using the certificate management system application, the derived credential in a shared vault on the mobile computing device;
   retrieving, by the mobile computing device and using the enrollment application, the derived credential from the shared vault; and
   providing, by the mobile computing device using the enrollment application and to the device management server, the derived credential to enroll the mobile computing device with at least one mobile device management service provided by the device management server wherein the derived credential comprises a first derived credential relating to mobile device management enrollment and a second derived credential relating to mobile application management enrollment.

2. The method of claim 1, further comprising:
   receiving a password from a user of the mobile computing device;

generating a password validation value based on the received password;

storing the password validation value in the shared vault on the mobile computing device; and providing the password to the certificate management system application.

3. The method of claim 2, further comprising:

encrypting the derived credential based on the password prior to storing the derived credential in the shared vault.

4. The method of claim 3, wherein encrypting the derived credential comprises using a private/public key pair.

5. The method of claim 2, further comprising:

validating the password to the certificate management system application based on the password validation value.

6. The method of claim 5, further comprising validating the password using password complexity validation rules.

7. The method of claim 1, further comprising receiving, from the device management server, a message identifying the certificate management system application on the mobile computing device.

8. The method of claim 1, further comprising:

receiving policies and applications from the device management server after completion of an enrollment process.

9. The method of claim 1, further comprising:

authenticating the certificate management system application with the certificate management system server.

10. The method of claim 1, further comprising:

switching, by the mobile computing device and based on storing the derived credential, to the enrollment application from the certificate management system application.

11. A device comprising:

one or more processors; and memory storing computer executable instructions that, when executed by one or more processors, cause the device to:

request, by the device and using an enrollment application operating on the device, configuration information for a device management server from an automatic discovery service;

receive, by the device, a message comprising the configuration information for the device management server from the automatic discovery service;

send, by the device and using the enrollment application, an enrollment request message to device management server, wherein the enrollment request message comprises the configuration information;

switch control, by the device, from the enrollment application to a certificate management system application operating on the device;

request, by the device and using the certificate management system application, a derived credential from a certificate management system server;

store, by the device and using the certificate management system application, the derived credential in a shared vault on the device;

retrieve, by the device and using the enrollment application, the derived credential from the shared vault; and provide, by the device using the enrollment application and to the device management server, the derived credential to enroll the device with at least one mobile device management service provided by the device management server, wherein the derived credential comprises a first derived credential relating to mobile device management enrollment and a second derived credential relating to mobile application management enrollment.

12. The device of claim 11, wherein the executable instructions further cause the device to receive, from the device management server, a message identifying the certificate management system application on the device.

13. The device of claim 11, wherein the executable instructions further cause the device to receive policies and applications from the device management server after completion of an enrollment process.

14. The device of claim 11, wherein the executable instructions further cause the device to authenticate the certificate management system application with the certificate management system server.

15. A non-transitory computer-readable medium storing computer-executable instructions that, when executed by a computer system, cause the computer system to perform a method comprising:

requesting, by the computer system and using an enrollment application operating on the computer system, configuration information for a device management server from an automatic discovery service;

receiving, by the computer system, a message comprising the configuration information for the device management server from the automatic discovery service;

sending, by the computer system and using the enrollment application, an enrollment request message to device management server, wherein the enrollment request message comprises the configuration information;

switching control, by the computer system, from the enrollment application to a certificate management system application operating on the computer system;

requesting, by the computer system and using the certificate management system application, a derived credential from a certificate management system server;

storing, by the computer system and using the certificate management system application, the derived credential in a shared vault on the computing system;

retrieving, by the computer system and using the enrollment application, the derived credential from the shared vault; and providing, by the computer system using the enrollment application and to the device management server, the derived credential to enroll the computer system with at least one mobile device management service provided by the device management server, wherein the derived credential comprises a first derived credential relating to mobile device management enrollment and a second derived credential relating to mobile application management enrollment.

16. The non-transitory computer-readable medium of claim 15, wherein the computer-executable instructions cause the computer system to further perform receiving, from the device management server, a message identifying the certificate management system application on the computer system.

17. The non-transitory computer-readable medium of claim 15, wherein the computer-executable instructions cause the computer system to further perform receiving policies and applications from the device management server after completion of an enrollment process.

18. The non-transitory computer-readable medium of claim 15, wherein the computer-executable instructions cause the computer system to further perform authenticating the certificate management system application with the certificate management system server.

\* \* \* \* \*